(12) United States Patent
Kang et al.

(10) Patent No.: US 8,254,247 B2
(45) Date of Patent: Aug. 28, 2012

(54) METHOD AND APPARATUS FOR TRANSMITTING SIGNAL IN A WIRELESS COMMUNICATION SYSTEM

(75) Inventors: Seung Hyun Kang, Anyang-si (KR); Han Gyu Cho, Anyang-si (KR); Jin Sam Kwak, Anyang-si (KR); Jin Soo Choi, Anyang-si (KR); Sung Ho Moon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 409 days.

(21) Appl. No.: 12/582,386

(22) Filed: Oct. 20, 2009

(65) Prior Publication Data
US 2010/0110874 A1    May 6, 2010

Related U.S. Application Data

(60) Provisional application No. 61/106,613, filed on Oct. 20, 2008, provisional application No. 61/109,157, filed on Oct. 28, 2008, provisional application No. 61/109,187, filed on Oct. 29, 2008, provisional application No. 61/109,184, filed on Oct. 29, 2008, provisional application No. 61/110,997, filed on Nov. 4, 2008, provisional application No. 61/112,769, filed on Nov. 9, 2008, provisional application No. 61/121,556, filed on Dec. 11, 2008, provisional application No. 61/157,915, filed on Mar. 6, 2009, provisional application No. 61/157,916, filed on Mar. 6, 2009.

(30) Foreign Application Priority Data

May 11, 2009 (KR) .................. 10-2009-0040778
Sep. 18, 2009 (KR) .................. 10-2009-0088530

(51) Int. Cl.
*H04J 11/00* (2006.01)

(52) U.S. Cl. .............. 370/208; 370/329; 370/344
(58) Field of Classification Search ................ None
See application file for complete search history.

(56) References Cited

U.S. PATENT DOCUMENTS

| | | | |
|---|---|---|---|
| 5,243,596 A | 9/1993 | Port et al. | |
| 2002/0159423 A1 | 10/2002 | Yao et al. | |
| 2005/0044206 A1 | 2/2005 | Johansson et al. | |
| 2005/0123023 A1* | 6/2005 | Smith et al. | 375/130 |
| 2005/0265227 A1 | 12/2005 | Byun et al. | |
| 2006/0083210 A1 | 4/2006 | Li et al. | |
| 2007/0049199 A1 | 3/2007 | Lim et al. | |
| 2007/0061433 A1 | 3/2007 | Reynolds et al. | |
| 2008/0037685 A1* | 2/2008 | Giannakis et al. | 375/299 |
| 2008/0159417 A1* | 7/2008 | Yin et al. | 375/260 |
| 2008/0298492 A1 | 12/2008 | Hwang et al. | |
| 2009/0010238 A1 | 1/2009 | Barak et al. | |
| 2009/0092148 A1* | 4/2009 | Zhang et al. | 370/458 |
| 2009/0285168 A1 | 11/2009 | Choi et al. | |
| 2009/0288771 A1* | 11/2009 | Farrell et al. | 156/332 |
| 2010/0074347 A1* | 3/2010 | Lomnitz et al. | 375/260 |

* cited by examiner

*Primary Examiner* — David Oveissi
(74) *Attorney, Agent, or Firm* — McKenna Long & Aldridge LLP

(57) ABSTRACT

A method and apparatus for transmitting a signal in a wireless communication system are disclosed. The signal transmission method includes grouping a plurality of subcarriers included in a first Orthogonal Frequency Division Multiple Access (OFDMA) symbol within distributed resources into a plurality of subcarrier groups, each subcarrier group having a predetermined number of subcarriers, distributing the plurality of subcarrier groups of the first OFDMA symbol according to a first permutation pattern, transmitting data in the distributed subcarrier groups of the first OFDMA symbol, grouping a plurality of subcarriers included in a second OFDMA symbol within the distributed resources into a plurality of subcarrier groups, each subcarrier group having a predetermined number of subcarriers, distributing the plurality of subcarrier groups of the second OFDMA symbol according to a second permutation pattern, and transmitting data in the distributed subcarrier groups of the second OFDMA symbol.

8 Claims, 24 Drawing Sheets

FIG. 10A

| 0 | 1 | 2 | 3 | 4 |
|---|---|---|---|---|
| 5 | 6 | 7 | 8 | 9 |
| 10 | 11 | 12 | 13 | 14 |
| 15 | 16 | 17 | 18 | 19 |
| 20 | 21 | 22 | 23 | 24 |
| 25 | 26 | 27 | 28 | 29 |
| 30 | 31 | 32 | 33 | 34 |
| 35 | 36 | 37 | 38 | 39 |

Row-wise index writing

FIG. 10B

| 0 | 3 | 1 | 4 | 2 |
|---|---|---|---|---|
| 3 | 1 | 4 | 2 | 0 |
| 1 | 4 | 2 | 0 | 3 |
| 4 | 2 | 0 | 3 | 1 |
| 2 | 0 | 3 | 1 | 4 |
| 0 | 3 | 1 | 4 | 2 |
| 3 | 1 | 4 | 2 | 0 |
| 1 | 4 | 2 | 0 | 3 |

| 0 | 3 | 1 | 4 | 2 |
|---|---|---|---|---|
| 8 | 6 | 9 | 7 | 5 |
| 11 | 14 | 12 | 10 | 13 |
| 19 | 17 | 15 | 18 | 16 |
| 22 | 20 | 23 | 21 | 24 |
| 25 | 28 | 26 | 29 | 27 |
| 33 | 31 | 34 | 32 | 30 |
| 36 | 39 | 37 | 35 | 38 |

(a) Intra-row permutation pattern      (b) Result of intra-row permutation

FIG. 10C

| 0 | 7 | 6 | 5 | 4 |
|---|---|---|---|---|
| 5 | 4 | 3 | 2 | 1 |
| 2 | 1 | 0 | 7 | 6 |
| 7 | 6 | 5 | 4 | 3 |
| 4 | 3 | 2 | 1 | 0 |
| 1 | 0 | 7 | 6 | 5 |
| 6 | 5 | 4 | 3 | 2 |
| 3 | 2 | 1 | 0 | 7 |

| 0 | 39 | 34 | 29 | 24 |
|---|---|---|---|---|
| 25 | 20 | 15 | 10 | 5 |
| 11 | 6 | 1 | 35 | 30 |
| 36 | 31 | 26 | 21 | 16 |
| 22 | 17 | 12 | 7 | 2 |
| 8 | 3 | 37 | 32 | 27 |
| 33 | 28 | 23 | 18 | 13 |
| 19 | 14 | 9 | 4 | 38 |

(a) Intra-row column pattern      (b) Result of intra-column permutation

FIG. 12

| 30 | 16 | 2 | 27 | 13 | 38 | 24 | 5 |
|----|----|----|----|----|----|----|----|
| 35 | 21 | 7 | 32 | 18 | 4 | 29 | 10 |
| 1 | 26 | 12 | 37 | 23 | 9 | 34 | 15 |
| 6 | 31 | 17 | 3 | 28 | 14 | 39 | 20 |
| 11 | 36 | 22 | 8 | 33 | 19 | 0 | 25 |

(c) t=2

| 27 | 13 | 38 | 24 | 5 | 30 | 16 | 2 |
|----|----|----|----|----|----|----|----|
| 32 | 18 | 4 | 29 | 10 | 35 | 21 | 7 |
| 37 | 23 | 9 | 34 | 15 | 1 | 26 | 12 |
| 3 | 28 | 14 | 39 | 20 | 6 | 31 | 17 |
| 8 | 33 | 19 | 0 | 25 | 11 | 36 | 22 |

(b) t=1

| 24 | 5 | 30 | 16 | 2 | 27 | 13 | 38 |
|----|----|----|----|----|----|----|----|
| 29 | 10 | 35 | 21 | 7 | 32 | 18 | 4 |
| 34 | 15 | 1 | 26 | 12 | 37 | 23 | 9 |
| 39 | 20 | 6 | 31 | 17 | 3 | 28 | 14 |
| 0 | 25 | 11 | 36 | 22 | 8 | 33 | 19 |

OFDMA symbol →
Subcarrier pair ↓

| P | 0 | 0 | P | 0 | 0 |
|---|---|---|---|---|---|
| 0 | 1 | 1 | 0 | 1 | 1 |
| 1 | 2 | 2 | 1 | 2 | 2 |
| 2 | 3 | 3 | 2 | 3 | 3 |
| 3 | 4 | P | 3 | 4 | P |
| 4 | 5 | 4 | 4 | 5 | 4 |
| 5 | 6 | 5 | 5 | 6 | 5 |
| 6 | 7 | 6 | 6 | 7 | 6 |
| 7 | P | 7 | 7 | P | 7 |
| P | 8 | 8 | P | 8 | 8 |
| 8 | 9 | 9 | 8 | 9 | 9 |
| 9 | 10 | 10 | 9 | 10 | 10 |
| 10 | 11 | 11 | 10 | 11 | 11 |
| 11 | 12 | P | 11 | 12 | P |
| 12 | 13 | 12 | 12 | 13 | 12 |
| 13 | 14 | 13 | 13 | 14 | 13 |
| 14 | 15 | 14 | 14 | 15 | 14 |
| 15 | P | 15 | 15 | P | 15 |
| P | 16 | 16 | P | 16 | 16 |
| 16 | 17 | 17 | 16 | 17 | 17 |
| 17 | 18 | 18 | 17 | 18 | 18 |
| 18 | 19 | 19 | 18 | 19 | 19 |
| 19 | 20 | P | 19 | 20 | P |
| 20 | 21 | 20 | 20 | 21 | 20 |
| 21 | 22 | 21 | 21 | 22 | 21 |
| 22 | 23 | 22 | 22 | 23 | 22 |
| 23 | P | 23 | 23 | P | 23 |
| P | 24 | 24 | P | 24 | 24 |
| 24 | 25 | 25 | 24 | 25 | 25 |
| 25 | 26 | 26 | 25 | 26 | 26 |
| 26 | 27 | 27 | 26 | 27 | 27 |
| 27 | 28 | P | 27 | 28 | P |
| 28 | 29 | 28 | 28 | 29 | 28 |
| 29 | 30 | 29 | 29 | 30 | 29 |
| 30 | 31 | 30 | 30 | 31 | 30 |
| 31 | P | 31 | 31 | P | 31 |
| P | 32 | 32 | P | 32 | 32 |
| 32 | 33 | 33 | 32 | 33 | 33 |
| 33 | 34 | 34 | 33 | 34 | 34 |
| 34 | 35 | 35 | 34 | 35 | 35 |
| 35 | 36 | P | 35 | 36 | P |
| 36 | 37 | 36 | 36 | 37 | 36 |
| 37 | 38 | 37 | 37 | 38 | 37 |
| 38 | 39 | 38 | 38 | 39 | 38 |
| 39 | P | 39 | 39 | P | 39 |

$N_{DRU}=5$

Row-wise index writing for each symbol

Intra-row permutation for 0-th symbol

Intra-row permutation for 1-st symbol

Intra-row permutation for 2-nd symbol

Intra-row permutation for 3-rd symbol

Intra-row permutation for 4-th symbol

Intra-row permutation for 5-th symbol

FIG. 16A

| PRU grouping | | Time variable permutation sequence | | | | | | |
|---|---|---|---|---|---|---|---|---|
| group | | freq | 0 | 1 | 2 | 3 | 4 | 5 time |
| 0 | 0 | 0 | 0 | 8 | 11 | 19 | 22 | 25 |
| | 1 | 1 | 25 | 33 | 36 | 0 | 8 | 11 |
| | 2 | 2 | 11 | 19 | 22 | 25 | 33 | 36 |
| | 3 | 3 | 36 | 0 | 8 | 11 | 19 | 22 |
| | 4 | 4 | 22 | 25 | 33 | 36 | 0 | 8 |
| 1 | 5 | 5 | 8 | 11 | 19 | 22 | 25 | 33 |
| | 6 | 6 | 33 | 36 | 0 | 8 | 11 | 19 |
| | 7 | 7 | 19 | 22 | 25 | 33 | 36 | 0 |
| | 8 | 8 | 39 | 3 | 6 | 14 | 17 | 20 |
| | 9 | 9 | 20 | 28 | 31 | 39 | 3 | 6 |
| 2 | 10 | 10 | 6 | 14 | 17 | 20 | 28 | 31 |
| | 11 | 11 | 31 | 39 | 3 | 6 | 14 | 17 |
| | 12 | 12 | 17 | 20 | 28 | 31 | 39 | 3 |
| | 13 | 13 | 3 | 6 | 14 | 17 | 20 | 28 |
| | 14 | 14 | 28 | 31 | 39 | 3 | 6 | 14 |
| 3 | 15 | 15 | 14 | 17 | 20 | 28 | 31 | 39 |
| | 16 | 16 | 34 | 37 | 1 | 9 | 12 | 15 |
| | 17 | 17 | 15 | 23 | 26 | 34 | 37 | 1 |
| | 18 | 18 | 1 | 9 | 12 | 15 | 23 | 26 |
| | 19 | 19 | 26 | 34 | 37 | 1 | 9 | 12 |
| 4 | 20 | 20 | 12 | 15 | 23 | 26 | 34 | 37 |
| | 21 | 21 | 37 | 1 | 9 | 12 | 15 | 23 |
| | 22 | 22 | 23 | 26 | 34 | 37 | 1 | 9 |
| | 23 | 23 | 9 | 12 | 15 | 23 | 26 | 34 |
| | 24 | 24 | 29 | 32 | 35 | 4 | 7 | 10 |
| 5 | 25 | 25 | 10 | 18 | 21 | 29 | 32 | 35 |
| | 26 | 26 | 35 | 4 | 7 | 10 | 18 | 21 |
| | 27 | 27 | 21 | 29 | 32 | 35 | 4 | 7 |
| | 28 | 28 | 7 | 10 | 18 | 21 | 29 | 32 |
| | 29 | 29 | 32 | 35 | 4 | 7 | 10 | 18 |
| 6 | 30 | 30 | 18 | 21 | 29 | 32 | 35 | 4 |
| | 31 | 31 | 4 | 7 | 10 | 18 | 21 | 29 |
| | 32 | 32 | 24 | 27 | 30 | 38 | 2 | 5 |
| | 33 | 33 | 5 | 13 | 16 | 24 | 27 | 30 |
| | 34 | 34 | 30 | 38 | 2 | 5 | 13 | 16 |
| 7 | 35 | 35 | 16 | 24 | 27 | 30 | 38 | 2 |
| | 36 | 36 | 2 | 5 | 13 | 16 | 24 | 27 |
| | 37 | 37 | 27 | 30 | 38 | 2 | 5 | 13 |
| | 38 | 38 | 13 | 16 | 24 | 27 | 30 | 38 |
| | 39 | 39 | 38 | 2 | 5 | 13 | 16 | 24 | subcarrier pair: rows 1–2 of PRU grouping column

FIG. 16B

| freq\time | \multicolumn{6}{c}{Group numbers} |
|---|---|---|---|---|---|---|
| | 0 | 1 | 2 | 3 | 4 | 5 |
| 0 | 0 | 1 | 2 | 3 | 4 | 5 |
| 1 | 5 | 6 | 7 | 0 | 1 | 2 |
| 2 | 2 | 3 | 4 | 5 | 6 | 7 |
| 3 | 7 | 0 | 1 | 2 | 3 | 4 |
| 4 | 4 | 5 | 6 | 7 | 0 | 1 |
| 5 | 1 | 2 | 3 | 4 | 5 | 6 |
| 6 | 6 | 7 | 0 | 1 | 2 | 3 |
| 7 | 3 | 4 | 5 | 6 | 7 | 0 |
| 8 | 7 | 0 | 1 | 2 | 3 | 4 |
| 9 | 4 | 5 | 6 | 7 | 0 | 1 |
| 10 | 1 | 2 | 3 | 4 | 5 | 6 |
| 11 | 6 | 7 | 0 | 1 | 2 | 3 |
| 12 | 3 | 4 | 5 | 6 | 7 | 0 |
| 13 | 0 | 1 | 2 | 3 | 4 | 5 |
| 14 | 5 | 6 | 7 | 0 | 1 | 2 |
| 15 | 2 | 3 | 4 | 5 | 6 | 7 |
| 16 | 6 | 7 | 0 | 1 | 2 | 3 |
| 17 | 3 | 4 | 5 | 6 | 7 | 0 |
| 18 | 0 | 1 | 2 | 3 | 4 | 5 |
| 19 | 5 | 6 | 7 | 0 | 1 | 2 |
| 20 | 2 | 3 | 4 | 5 | 6 | 7 |
| 21 | 7 | 0 | 1 | 2 | 3 | 4 |
| 22 | 4 | 5 | 6 | 7 | 0 | 1 |
| 23 | 1 | 2 | 3 | 4 | 5 | 6 |
| 24 | 5 | 6 | 7 | 0 | 1 | 2 |
| 25 | 2 | 3 | 4 | 5 | 6 | 7 |
| 26 | 7 | 0 | 1 | 2 | 3 | 4 |
| 27 | 4 | 5 | 6 | 7 | 0 | 1 |
| 28 | 1 | 2 | 3 | 4 | 5 | 6 |
| 29 | 6 | 7 | 0 | 1 | 2 | 3 |
| 30 | 3 | 4 | 5 | 6 | 7 | 0 |
| 31 | 0 | 1 | 2 | 3 | 4 | 5 |
| 32 | 4 | 5 | 6 | 7 | 0 | 1 |
| 33 | 1 | 2 | 3 | 4 | 5 | 6 |
| 34 | 6 | 7 | 0 | 1 | 2 | 3 |
| 35 | 3 | 4 | 5 | 6 | 7 | 0 |
| 36 | 0 | 1 | 2 | 3 | 4 | 5 |
| 37 | 5 | 6 | 7 | 0 | 1 | 2 |
| 38 | 2 | 3 | 4 | 5 | 6 | 7 |
| 39 | 7 | 0 | 1 | 2 | 3 | 4 |

| freq\time | \multicolumn{6}{c}{Element numbers in each group} |
|---|---|---|---|---|---|---|
| | 0 | 1 | 2 | 3 | 4 | 5 |
| 0 | 0 | 3 | 1 | 4 | 2 | 0 |
| 1 | 0 | 3 | 1 | 0 | 3 | 1 |
| 2 | 1 | 4 | 2 | 0 | 3 | 1 |
| 3 | 1 | 0 | 3 | 1 | 4 | 2 |
| 4 | 2 | 0 | 3 | 1 | 0 | 3 |
| 5 | 3 | 1 | 4 | 2 | 0 | 3 |
| 6 | 3 | 1 | 0 | 3 | 1 | 4 |
| 7 | 4 | 2 | 0 | 3 | 1 | 0 |
| 8 | 4 | 3 | 1 | 4 | 2 | 0 |
| 9 | 0 | 3 | 1 | 4 | 3 | 1 |
| 10 | 1 | 4 | 2 | 0 | 3 | 1 |
| 11 | 1 | 4 | 3 | 1 | 4 | 2 |
| 12 | 2 | 0 | 3 | 1 | 4 | 3 |
| 13 | 3 | 1 | 4 | 2 | 0 | 3 |
| 14 | 3 | 1 | 4 | 3 | 1 | 4 |
| 15 | 4 | 2 | 0 | 3 | 1 | 4 |
| 16 | 4 | 2 | 1 | 4 | 2 | 0 |
| 17 | 0 | 3 | 1 | 4 | 2 | 1 |
| 18 | 1 | 4 | 2 | 0 | 3 | 1 |
| 19 | 1 | 4 | 2 | 1 | 4 | 2 |
| 20 | 2 | 0 | 3 | 1 | 4 | 2 |
| 21 | 2 | 1 | 4 | 2 | 0 | 3 |
| 22 | 3 | 1 | 4 | 2 | 1 | 4 |
| 23 | 4 | 2 | 0 | 3 | 1 | 4 |
| 24 | 4 | 2 | 0 | 4 | 2 | 0 |
| 25 | 0 | 3 | 1 | 4 | 2 | 0 |
| 26 | 0 | 4 | 2 | 0 | 3 | 1 |
| 27 | 1 | 4 | 2 | 0 | 4 | 2 |
| 28 | 2 | 0 | 3 | 1 | 4 | 2 |
| 29 | 2 | 0 | 4 | 2 | 0 | 3 |
| 30 | 3 | 1 | 4 | 2 | 0 | 4 |
| 31 | 4 | 2 | 0 | 3 | 1 | 4 |
| 32 | 4 | 2 | 0 | 3 | 2 | 0 |
| 33 | 0 | 3 | 1 | 4 | 2 | 0 |
| 34 | 0 | 3 | 2 | 0 | 3 | 1 |
| 35 | 1 | 4 | 2 | 0 | 3 | 2 |
| 36 | 2 | 0 | 3 | 1 | 4 | 2 |
| 37 | 2 | 0 | 3 | 2 | 0 | 3 |
| 38 | 3 | 1 | 4 | 2 | 0 | 3 |
| 39 | 3 | 2 | 0 | 3 | 1 | 4 |

FIG. 17A

PRU grouping / Time variable permutation sequence

| group | subcarrier pair | freq | 0 | 1 | 2 | 3 | 4 | 5 (time) |
|---|---|---|---|---|---|---|---|---|
| 0 | 0 | 0 | 0 | 6 | 12 | 18 | 24 | 25 |
|   | 1 | 1 | 25 | 31 | 37 | 4 | 5 | 11 |
|   | 2 | 2 | 11 | 17 | 23 | 29 | 30 | 36 |
|   | 3 | 3 | 36 | 3 | 9 | 10 | 16 | 22 |
|   | 4 | 4 | 22 | 28 | 34 | 35 | 2 | 8 |
| 1 | 5 | 5 | 8 | 14 | 15 | 21 | 27 | 33 |
|   | 6 | 6 | 33 | 39 | 1 | 7 | 13 | 19 |
|   | 7 | 7 | 19 | 20 | 26 | 32 | 38 | 0 |
|   | 8 | 8 | 39 | 1 | 7 | 13 | 19 | 20 |
|   | 9 | 9 | 20 | 26 | 32 | 38 | 0 | 6 |
| 2 | 10 | 10 | 6 | 12 | 18 | 24 | 25 | 31 |
|   | 11 | 11 | 31 | 37 | 4 | 5 | 11 | 17 |
|   | 12 | 12 | 17 | 23 | 29 | 30 | 36 | 3 |
|   | 13 | 13 | 3 | 9 | 10 | 16 | 22 | 28 |
|   | 14 | 14 | 28 | 34 | 35 | 2 | 8 | 14 |
| 3 | 15 | 15 | 14 | 15 | 21 | 27 | 33 | 39 |
|   | 16 | 16 | 34 | 35 | 2 | 8 | 14 | 15 |
|   | 17 | 17 | 15 | 21 | 27 | 33 | 39 | 1 |
|   | 18 | 18 | 1 | 7 | 13 | 19 | 20 | 26 |
|   | 19 | 19 | 26 | 32 | 38 | 0 | 6 | 12 |
| 4 | 20 | 20 | 12 | 18 | 24 | 25 | 31 | 37 |
|   | 21 | 21 | 37 | 4 | 5 | 11 | 17 | 23 |
|   | 22 | 22 | 23 | 29 | 30 | 36 | 3 | 9 |
|   | 23 | 23 | 9 | 10 | 16 | 22 | 28 | 34 |
|   | 24 | 24 | 29 | 30 | 36 | 3 | 9 | 10 |
| 5 | 25 | 25 | 10 | 16 | 22 | 28 | 34 | 35 |
|   | 26 | 26 | 35 | 2 | 8 | 14 | 15 | 21 |
|   | 27 | 27 | 21 | 27 | 33 | 39 | 1 | 7 |
|   | 28 | 28 | 7 | 13 | 19 | 20 | 26 | 32 |
|   | 29 | 29 | 32 | 38 | 0 | 6 | 12 | 18 |
| 6 | 30 | 30 | 18 | 24 | 25 | 31 | 37 | 4 |
|   | 31 | 31 | 4 | 5 | 11 | 17 | 23 | 29 |
|   | 32 | 32 | 24 | 25 | 31 | 37 | 4 | 5 |
|   | 33 | 33 | 5 | 11 | 17 | 23 | 29 | 30 |
|   | 34 | 34 | 30 | 36 | 3 | 9 | 10 | 16 |
| 7 | 35 | 35 | 16 | 22 | 28 | 34 | 35 | 2 |
|   | 36 | 36 | 2 | 8 | 14 | 15 | 21 | 27 |
|   | 37 | 37 | 27 | 33 | 39 | 1 | 7 | 13 |
|   | 38 | 38 | 13 | 19 | 20 | 26 | 32 | 38 |
|   | 39 | 39 | 38 | 0 | 6 | 12 | 18 | 24 |

FIG. 17B

| | \\ | Group numbers | | | | | |
|---|---|---|---|---|---|---|---|
| | 0 | 1 | 2 | 3 | 4 | 5 | time |
| 0 | 0 | 1 | 2 | 3 | 4 | 5 | |
| 1 | 5 | 6 | 7 | 0 | 1 | 2 | |
| 2 | 2 | 3 | 4 | 5 | 6 | 7 | |
| 3 | 7 | 0 | 1 | 2 | 3 | 4 | |
| 4 | 4 | 5 | 6 | 7 | 0 | 1 | |
| 5 | 1 | 2 | 3 | 4 | 5 | 6 | |
| 6 | 6 | 7 | 0 | 1 | 2 | 3 | |
| 7 | 3 | 4 | 5 | 6 | 7 | 0 | |
| 8 | 7 | 0 | 1 | 2 | 3 | 4 | |
| 9 | 4 | 5 | 6 | 7 | 0 | 1 | |
| 10 | 1 | 2 | 3 | 4 | 5 | 6 | |
| 11 | 6 | 7 | 0 | 1 | 2 | 3 | |
| 12 | 3 | 4 | 5 | 6 | 7 | 0 | |
| 13 | 0 | 1 | 2 | 3 | 4 | 5 | |
| 14 | 5 | 6 | 7 | 0 | 1 | 2 | |
| 15 | 2 | 3 | 4 | 5 | 6 | 7 | |
| 16 | 6 | 7 | 0 | 1 | 2 | 3 | |
| 17 | 3 | 4 | 5 | 6 | 7 | 0 | |
| 18 | 0 | 1 | 2 | 3 | 4 | 5 | |
| 19 | 5 | 6 | 7 | 0 | 1 | 2 | |
| 20 | 2 | 3 | 4 | 5 | 6 | 7 | |
| 21 | 7 | 0 | 1 | 2 | 3 | 4 | |
| 22 | 4 | 5 | 6 | 7 | 0 | 1 | |
| 23 | 1 | 2 | 3 | 4 | 5 | 6 | |
| 24 | 5 | 6 | 7 | 0 | 1 | 2 | |
| 25 | 2 | 3 | 4 | 5 | 6 | 7 | |
| 26 | 7 | 0 | 1 | 2 | 3 | 4 | |
| 27 | 4 | 5 | 6 | 7 | 0 | 1 | |
| 28 | 1 | 2 | 3 | 4 | 5 | 6 | |
| 29 | 6 | 7 | 0 | 1 | 2 | 3 | |
| 30 | 3 | 4 | 5 | 6 | 7 | 0 | |
| 31 | 0 | 1 | 2 | 3 | 4 | 5 | |
| 32 | 4 | 5 | 6 | 7 | 0 | 1 | |
| 33 | 1 | 2 | 3 | 4 | 5 | 6 | |
| 34 | 6 | 7 | 0 | 1 | 2 | 3 | |
| 35 | 3 | 4 | 5 | 6 | 7 | 0 | |
| 36 | 0 | 1 | 2 | 3 | 4 | 5 | |
| 37 | 5 | 6 | 7 | 0 | 1 | 2 | |
| 38 | 2 | 3 | 4 | 5 | 6 | 7 | |
| 39 | 7 | 0 | 1 | 2 | 3 | 4 | | freq

| | Element numbers in each group | | | | | | |
|---|---|---|---|---|---|---|---|
| | 0 | 1 | 2 | 3 | 4 | 5 | time |
| 0 | 0 | 1 | 2 | 3 | 4 | 0 | |
| 1 | 0 | 1 | 2 | 4 | 0 | 1 | |
| 2 | 1 | 2 | 3 | 4 | 0 | 1 | |
| 3 | 1 | 3 | 4 | 0 | 1 | 2 | |
| 4 | 2 | 3 | 4 | 0 | 2 | 3 | |
| 5 | 3 | 4 | 0 | 1 | 2 | 3 | |
| 6 | 3 | 4 | 1 | 2 | 3 | 4 | |
| 7 | 4 | 0 | 1 | 2 | 3 | 0 | |
| 8 | 4 | 1 | 2 | 3 | 4 | 0 | |
| 9 | 0 | 1 | 2 | 3 | 0 | 1 | |
| 10 | 1 | 2 | 3 | 4 | 0 | 1 | |
| 11 | 1 | 2 | 4 | 0 | 1 | 2 | |
| 12 | 2 | 3 | 4 | 0 | 1 | 3 | |
| 13 | 3 | 4 | 0 | 1 | 2 | 3 | |
| 14 | 3 | 4 | 0 | 2 | 3 | 4 | |
| 15 | 4 | 0 | 1 | 2 | 3 | 4 | |
| 16 | 4 | 0 | 2 | 3 | 4 | 0 | |
| 17 | 0 | 1 | 2 | 3 | 4 | 1 | |
| 18 | 1 | 2 | 3 | 4 | 0 | 1 | |
| 19 | 1 | 2 | 3 | 0 | 1 | 2 | |
| 20 | 2 | 3 | 4 | 0 | 1 | 2 | |
| 21 | 2 | 4 | 0 | 1 | 2 | 3 | |
| 22 | 3 | 4 | 0 | 1 | 3 | 4 | |
| 23 | 4 | 0 | 1 | 2 | 3 | 4 | |
| 24 | 4 | 0 | 1 | 3 | 4 | 0 | |
| 25 | 0 | 1 | 2 | 3 | 4 | 0 | |
| 26 | 0 | 2 | 3 | 4 | 0 | 1 | |
| 27 | 1 | 2 | 3 | 4 | 1 | 2 | |
| 28 | 2 | 3 | 4 | 0 | 1 | 2 | |
| 29 | 2 | 3 | 0 | 1 | 2 | 3 | |
| 30 | 3 | 4 | 0 | 1 | 2 | 4 | |
| 31 | 4 | 0 | 1 | 2 | 3 | 4 | |
| 32 | 4 | 0 | 1 | 2 | 4 | 0 | |
| 33 | 0 | 1 | 2 | 3 | 4 | 0 | |
| 34 | 0 | 1 | 3 | 4 | 0 | 1 | |
| 35 | 1 | 2 | 3 | 4 | 0 | 2 | |
| 36 | 2 | 3 | 4 | 0 | 1 | 2 | |
| 37 | 2 | 3 | 4 | 1 | 2 | 3 | |
| 38 | 3 | 4 | 0 | 1 | 2 | 3 | |
| 39 | 3 | 0 | 1 | 2 | 3 | 4 | | freq

FIG. 18A

| | PRU grouping | | | Time variable permutation sequence | | | | | |
|---|---|---|---|---|---|---|---|---|---|
| | group | | | | 0 | 1 | 2 | 3 | 4 | 5 time |
| 0 | 0 | | 0 | 0 | 3 | 1 | 4 | 2 | 0 |
| | | 1 | | 1 | 25 | 28 | 26 | 29 | 27 | 25 |
| subcarrier pair | | 2 | | 2 | 11 | 14 | 12 | 10 | 13 | 11 |
| | | 3 | | 3 | 36 | 39 | 37 | 35 | 38 | 36 |
| | | 4 | | 4 | 22 | 20 | 23 | 21 | 24 | 22 |
| 1 | | 5 | | 5 | 8 | 6 | 9 | 7 | 5 | 8 |
| | | 6 | | 6 | 33 | 31 | 34 | 32 | 30 | 33 |
| | | 7 | | 7 | 19 | 17 | 15 | 18 | 16 | 19 |
| | | 8 | | 8 | 39 | 37 | 35 | 38 | 36 | 39 |
| | | 9 | | 9 | 20 | 23 | 21 | 24 | 22 | 20 |
| 2 | | 10 | | 10 | 6 | 9 | 7 | 5 | 8 | 6 |
| | | 11 | | 11 | 31 | 34 | 32 | 30 | 33 | 31 |
| | | 12 | | 12 | 17 | 15 | 18 | 16 | 19 | 17 |
| | | 13 | | 13 | 3 | 1 | 4 | 2 | 0 | 3 |
| | | 14 | | 14 | 28 | 26 | 29 | 27 | 25 | 28 |
| 3 | | 15 | | 15 | 14 | 12 | 10 | 13 | 11 | 14 |
| | | 16 | | 16 | 34 | 32 | 30 | 33 | 31 | 34 |
| | | 17 | | 17 | 15 | 18 | 16 | 19 | 17 | 15 |
| | | 18 | ⇨ | 18 | 1 | 4 | 2 | 0 | 3 | 1 |
| | | 19 | | 19 | 26 | 29 | 27 | 25 | 28 | 26 |
| 4 | | 20 | | 20 | 12 | 10 | 13 | 11 | 14 | 12 |
| | | 21 | | 21 | 37 | 35 | 38 | 36 | 39 | 37 |
| | | 22 | | 22 | 23 | 21 | 24 | 22 | 20 | 23 |
| | | 23 | | 23 | 9 | 7 | 5 | 8 | 6 | 9 |
| | | 24 | | 24 | 29 | 27 | 25 | 28 | 26 | 29 |
| 5 | | 25 | | 25 | 10 | 13 | 11 | 14 | 12 | 10 |
| | | 26 | | 26 | 35 | 38 | 36 | 39 | 37 | 35 |
| | | 27 | | 27 | 21 | 24 | 22 | 20 | 23 | 21 |
| | | 28 | | 28 | 7 | 5 | 8 | 6 | 9 | 7 |
| | | 29 | | 29 | 32 | 30 | 33 | 31 | 34 | 32 |
| 6 | | 30 | | 30 | 18 | 16 | 19 | 17 | 15 | 18 |
| | | 31 | | 31 | 4 | 2 | 0 | 3 | 1 | 4 |
| | | 32 | | 32 | 24 | 22 | 20 | 23 | 21 | 24 |
| | | 33 | | 33 | 5 | 8 | 6 | 9 | 7 | 5 |
| | | 34 | | 34 | 30 | 33 | 31 | 34 | 32 | 30 |
| 7 | | 35 | | 35 | 16 | 19 | 17 | 15 | 18 | 16 |
| | | 36 | | 36 | 2 | 0 | 3 | 1 | 4 | 2 |
| | | 37 | | 37 | 27 | 25 | 28 | 26 | 29 | 27 |
| | | 38 | | 38 | 13 | 11 | 14 | 12 | 10 | 13 |
| | | 39 | | 39 | 38 | 36 | 39 | 37 | 35 | 38 |
| | group | | | freq | | | | | | |

FIG. 18B

Group numbers

| freq\time | 0 | 1 | 2 | 3 | 4 | 5 |
|---|---|---|---|---|---|---|
| 0 | 0 | 0 | 0 | 0 | 0 | 0 |
| 1 | 5 | 5 | 5 | 5 | 5 | 5 |
| 2 | 2 | 2 | 2 | 2 | 2 | 2 |
| 3 | 7 | 7 | 7 | 7 | 7 | 7 |
| 4 | 4 | 4 | 4 | 4 | 4 | 4 |
| 5 | 1 | 1 | 1 | 1 | 1 | 1 |
| 6 | 6 | 6 | 6 | 6 | 6 | 6 |
| 7 | 3 | 3 | 3 | 3 | 3 | 3 |
| 8 | 7 | 7 | 7 | 7 | 7 | 7 |
| 9 | 4 | 4 | 4 | 4 | 4 | 4 |
| 10 | 1 | 1 | 1 | 1 | 1 | 1 |
| 11 | 6 | 6 | 6 | 6 | 6 | 6 |
| 12 | 3 | 3 | 3 | 3 | 3 | 3 |
| 13 | 0 | 0 | 0 | 0 | 0 | 0 |
| 14 | 5 | 5 | 5 | 5 | 5 | 5 |
| 15 | 2 | 2 | 2 | 2 | 2 | 2 |
| 16 | 6 | 6 | 6 | 6 | 6 | 6 |
| 17 | 3 | 3 | 3 | 3 | 3 | 3 |
| 18 | 0 | 0 | 0 | 0 | 0 | 0 |
| 19 | 5 | 5 | 5 | 5 | 5 | 5 |
| 20 | 2 | 2 | 2 | 2 | 2 | 2 |
| 21 | 7 | 7 | 7 | 7 | 7 | 7 |
| 22 | 4 | 4 | 4 | 4 | 4 | 4 |
| 23 | 1 | 1 | 1 | 1 | 1 | 1 |
| 24 | 5 | 5 | 5 | 5 | 5 | 5 |
| 25 | 2 | 2 | 2 | 2 | 2 | 2 |
| 26 | 7 | 7 | 7 | 7 | 7 | 7 |
| 27 | 4 | 4 | 4 | 4 | 4 | 4 |
| 28 | 1 | 1 | 1 | 1 | 1 | 1 |
| 29 | 6 | 6 | 6 | 6 | 6 | 6 |
| 30 | 3 | 3 | 3 | 3 | 3 | 3 |
| 31 | 0 | 0 | 0 | 0 | 0 | 0 |
| 32 | 4 | 4 | 4 | 4 | 4 | 4 |
| 33 | 1 | 1 | 1 | 1 | 1 | 1 |
| 34 | 6 | 6 | 6 | 6 | 6 | 6 |
| 35 | 3 | 3 | 3 | 3 | 3 | 3 |
| 36 | 0 | 0 | 0 | 0 | 0 | 0 |
| 37 | 5 | 5 | 5 | 5 | 5 | 5 |
| 38 | 2 | 2 | 2 | 2 | 2 | 2 |
| 39 | 7 | 7 | 7 | 7 | 7 | 7 |

Element numbers in each group

| freq\time | 0 | 1 | 2 | 3 | 4 | 5 |
|---|---|---|---|---|---|---|
| 0 | 0 | 3 | 1 | 4 | 2 | 0 |
| 1 | 0 | 3 | 1 | 4 | 2 | 0 |
| 2 | 1 | 4 | 2 | 0 | 3 | 1 |
| 3 | 1 | 4 | 2 | 0 | 3 | 1 |
| 4 | 2 | 0 | 3 | 1 | 4 | 2 |
| 5 | 3 | 1 | 4 | 2 | 0 | 3 |
| 6 | 3 | 1 | 4 | 2 | 0 | 3 |
| 7 | 4 | 2 | 0 | 3 | 1 | 4 |
| 8 | 4 | 2 | 0 | 3 | 1 | 4 |
| 9 | 0 | 3 | 1 | 4 | 2 | 0 |
| 10 | 1 | 4 | 2 | 0 | 3 | 1 |
| 11 | 1 | 4 | 2 | 0 | 3 | 1 |
| 12 | 2 | 0 | 3 | 1 | 4 | 2 |
| 13 | 3 | 1 | 4 | 2 | 0 | 3 |
| 14 | 3 | 1 | 4 | 2 | 0 | 3 |
| 15 | 4 | 2 | 0 | 3 | 1 | 4 |
| 16 | 4 | 2 | 0 | 3 | 1 | 4 |
| 17 | 0 | 3 | 1 | 4 | 2 | 0 |
| 18 | 1 | 4 | 2 | 0 | 3 | 1 |
| 19 | 1 | 4 | 2 | 0 | 3 | 1 |
| 20 | 2 | 0 | 3 | 1 | 4 | 2 |
| 21 | 2 | 0 | 3 | 1 | 4 | 2 |
| 22 | 3 | 1 | 4 | 2 | 0 | 3 |
| 23 | 4 | 2 | 0 | 3 | 1 | 4 |
| 24 | 4 | 2 | 0 | 3 | 1 | 4 |
| 25 | 0 | 3 | 1 | 4 | 2 | 0 |
| 26 | 0 | 3 | 1 | 4 | 2 | 0 |
| 27 | 1 | 4 | 2 | 0 | 3 | 1 |
| 28 | 2 | 0 | 3 | 1 | 4 | 2 |
| 29 | 2 | 0 | 3 | 1 | 4 | 2 |
| 30 | 3 | 1 | 4 | 2 | 0 | 3 |
| 31 | 4 | 2 | 0 | 3 | 1 | 4 |
| 32 | 4 | 2 | 0 | 3 | 1 | 4 |
| 33 | 0 | 3 | 1 | 4 | 2 | 0 |
| 34 | 0 | 3 | 1 | 4 | 2 | 0 |
| 35 | 1 | 4 | 2 | 0 | 3 | 1 |
| 36 | 2 | 0 | 3 | 1 | 4 | 2 |
| 37 | 2 | 0 | 3 | 1 | 4 | 2 |
| 38 | 3 | 1 | 4 | 2 | 0 | 3 |
| 39 | 3 | 1 | 4 | 2 | 0 | 3 |

METHOD AND APPARATUS FOR TRANSMITTING SIGNAL IN A WIRELESS COMMUNICATION SYSTEM

This application claims the benefit of U.S. provisional application 61/106,613, filed on Oct. 20, 2008, U.S. provisional application 61/109,157, filed on Oct. 28, 2008, U.S. provisional application 61/109,187, filed on Oct. 29, 2008, U.S. provisional application 61/109,184, filed on Oct. 29, 2008, U.S. provisional application 61/110,997, filed on Nov. 4, 2008, U.S. provisional application 61/112,769, filed on Nov. 9, 2008, U.S. provisional application 61/121,556, filed on Dec. 11, 2008, U.S. provisional application 61/157,915, filed on Mar. 6, 2009, U.S. provisional application 61/157,916, filed on Mar. 6, 2009, Korean Patent Application No. 10-2009-0040778, filed on May 11, 2009, and Korean Patent Application No. 10-2009-0088530, filed on Sep. 18, 2009, which are hereby incorporated by reference as if fully set forth herein.

BACKGROUND OF THE INVENTION

1. Field of the Invention

The present invention relates to a wireless communication system, and more particularly, to a method and apparatus for transmitting a signal in a wireless communication system.

2. Discussion of the Related Art

FIG. 1 is a diagram illustrating the configuration of an exemplary wireless communication system.

Referring to FIG. 1, a wireless communication system 100 includes a plurality of Base Stations (BSs) 110a, 110b and 110c and a plurality of User Equipments (UEs) 120a to 120i. The wireless communication system 100 may include homogeneous networks or heterogeneous networks. Heterogeneous networks refer to networks in which different network entities coexist, such as a macro cell, a femto cell, a pico cell, a relay station, etc. A BS is usually a fixed station that communicates with UEs. Each BS 110a, 110b or 110c provides services to its specific geographical area 102a, 102b or 102c. For the purpose of improving system performance, the specific service area of the BS may further be divided into a plurality of smaller areas 104a, 104b and 104c. These smaller areas may be called cells, sectors or segments. In an Institute of Electrical and Electronics Engineers (IEEE) 802.16 system, cell Identities (IDs) (Cell_IDs or IDCells) are assigned from the perspective of a whole system, whereas sector IDs or segment IDs are assigned from the perspective of the service coverage of each BS, ranging from 0 to 2. The UEs 120a to 120i, which are mobile or fixed, are generally distributed over the wireless communication system 100. Each UE may communicate with at least one BS on a downlink and an uplink at a point of time. The communication may be conducted in Frequency Division Multiple Access (FDMA), Time Division Multiple Access (TDMA), Code Division Multiple Access (CDMA), Single Carrier-FDMA (SC-FDMA), Multi Carrier-FDMA (MC-FDMA), Orthogonal Frequency Division Multiple Access (OFDMA), or a combination of them. Herein, a downlink refers to a communication link directed from a BS to a UE and an uplink refers to a communication link directed from the UE to the BS.

FIG. 2 illustrates an exemplary channel change in frequency in the wireless communication system.

Referring to FIG. 2, if a system band has a bandwidth greater than a coherence bandwidth, a channel may fluctuate greatly in the system band. Then a frequency diversity gain may be achieved by spreading a transmission signal across all or part of the system band along the frequency axis. For example, allocation of frequency resources to the transmission signal by appropriate permutation may lead to mixing and spreading of the transmission signal across a predetermined bandwidth. Accordingly, there exists a continuous need for a permutation scheme to effectively distribute a transmission signal across a predetermined bandwidth.

SUMMARY OF THE INVENTION

Accordingly, the present invention is directed to a method and apparatus for transmitting a signal in a wireless communication system that substantially obviates one or more problems due to limitations and disadvantages of the related art.

An object of the present invention is to provide a method and apparatus for transmitting a signal in a wireless communication system.

Another object of the present invention is to provide a permutation method and apparatus for increasing a diversity gain in transmitting a signal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting data by a Base station (BS) in a wireless communication system includes grouping a plurality of subcarriers included in a first Orthogonal Frequency Division Multiplexing (OFDM) symbol within distributed resources into a plurality of subcarrier groups, each subcarrier group having a predetermined number of subcarriers, distributing the plurality of subcarrier groups of the first OFDMA symbol according to a first permutation pattern, transmitting data in the distributed subcarrier groups of the first OFDMA symbol, grouping a plurality of subcarriers included in a second OFDMA symbol within the distributed resources into a plurality of subcarrier groups, each subcarrier group having a predetermined number of subcarriers, distributing the plurality of subcarrier groups of the second OFDMA symbol according to a second permutation pattern, and transmitting data in the distributed subcarrier groups of the second OFDMA symbol.

In another aspect of the present invention, a BS includes a Radio Frequency (RF) module for transmitting a signal through distributed resources to a UE and a processor for generating the signal. The processor is adapted to perform a data transmission method including grouping a plurality of subcarriers included in a first OFDMA symbol within distributed resources into a plurality of subcarrier groups, each subcarrier group having a predetermined number of subcarriers, distributing the plurality of subcarrier groups of the first OFDMA symbol according to a first permutation pattern, transmitting data in the distributed subcarrier groups of the first OFDMA symbol, grouping a plurality of subcarriers included in a second OFDMA symbol within the distributed resources into a plurality of subcarrier groups, each subcarrier group having a predetermined number of subcarriers, distributing the plurality of subcarrier groups of the second OFDMA symbol according to a second permutation pattern, and transmitting data in the distributed subcarrier groups of the second OFDMA symbol.

In another aspect of the present invention, a method for processing data by a User Equipment (UE) in a wireless communication system includes receiving a signal in distributed resources from a base station, grouping a plurality of subcarriers included in a first OFDMA symbol within the distributed resources into a plurality of subcarrier groups, each subcarrier group having a predetermined number of subcarriers, de-distributing the plurality of subcarrier groups of the first OFDMA symbol according to a first permutation pattern, decoding data in the de-distributed subcarrier groups of the first OFDMA symbol, grouping a plurality of subcarriers included in a second OFDMA symbol within the distributed resources into a plurality of subcarrier groups, each subcarrier group having a predetermined number of subcarriers, de-distributing the plurality of subcarrier groups of the second OFDMA symbol according to a second permutation pattern, and decoding data in the de-distributed subcarrier groups of the second OFDMA symbol.

In a further aspect of the present invention, a UE includes an RF module for receiving a signal through distributed resources from a BS and a processor for processing the received signal. The processor is adapted to perform a data processing method including grouping a plurality of subcarriers in a first OFDMA symbol within the distributed resources into a plurality of subcarrier groups, each subcarrier group having a predetermined number of subcarriers, de-distributing the plurality of subcarrier groups of the first OFDMA symbol according to a first permutation pattern, decoding data in the de-distributed subcarrier groups of the first OFDMA symbol, grouping a plurality of subcarriers in a second OFDMA symbol within the distributed resources into a plurality of subcarrier groups, each subcarrier group having a predetermined number of subcarriers, de-distributing the plurality of subcarrier groups of the second OFDMA symbol according to a second permutation pattern, and decoding data in the de-distributed subcarrier groups of the second OFDMA symbol.

The distributed resources may include one or more Distributed Resource Units (DRUs).

The plurality of subcarrier groups in each of the first and second OFDMA symbols may consist of remaining subcarriers except pilot subcarriers.

The second permutation pattern may be modified from the first permutation pattern in consideration of an OFDMA symbol index. The OFDMA symbol index may be used as one of a cyclic shift value and a masking value with respect to the first permutation pattern.

The first and second permutation patterns may be generated using at least one of time-variant intra-row permutation and time-variant intra-column permutation.

The first and second permutation patterns may be generated using a permutation sequence calculated by the following equation, $$g(\text{PermSeq}(\ ), s, m, l) = \{\text{PermSeq}(\{f(m,s)+s+l\} \bmod \{L_{DRU,FPi}\}) + \text{DL\_PermBase}\} \bmod \{L_{DRU,FPi}\}$$

where PermSeq( ) denotes a base permutation sequence of length $L_{DRU,FPi}$, $L_{DRU,FPi}$ denotes the number of DRUs in an $i^{th}$ frequency partition, s denotes a Logical DRU (LDRU) index, l denotes an OFDMA symbol index, DL_PermBase denotes 0 or a positive integer, and mod represents a modulo operation.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIGS. 10A, 10B and 10C illustrate an exemplary permutation based on block interleaving.

FIG. 12 illustrates an exemplary permutation that is performed taking time into account according to the embodiment of the present invention.

FIGS. 15A, 15B and 15C illustrate an exemplary inner permutation when $N_{DRU}=5$ according to the embodiment of the present invention.

FIGS. 16A to 18B illustrate results of performing time-variant permutation for distributed resources according to an embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. Embodiments of the present invention are examples in which the technical features of the present invention are applied to a system using a plurality of orthogonal subcarriers. While the present invention is described in the context of an Institute of Electronics and Electrical (IEEE) 802.16 system by way of example, it is also applicable to a variety of wireless communication systems including a 3$^{rd}$ Generation Partnership Project (3GPP) system.

Figure 1:
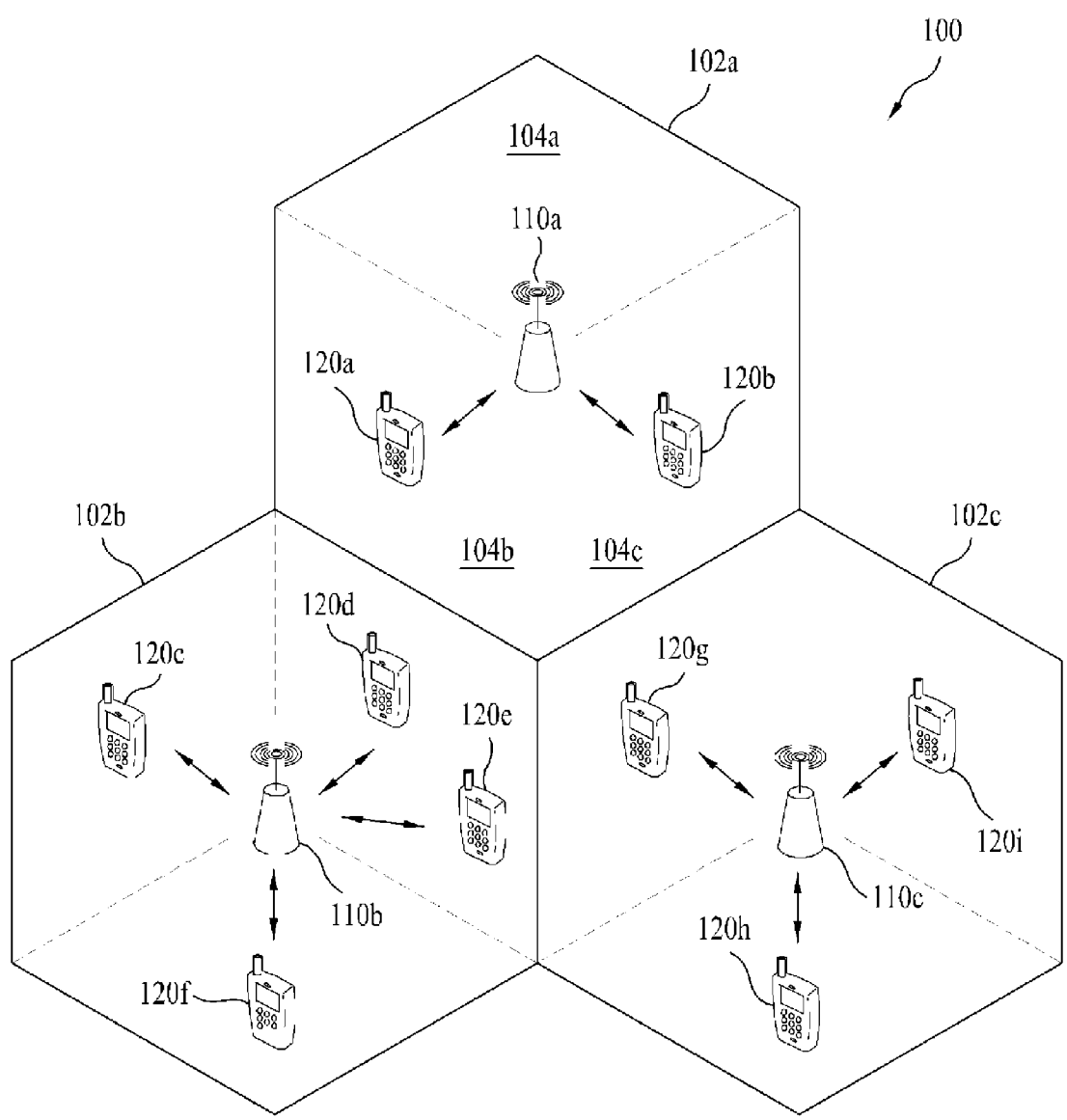
FIG. 1 is a diagram illustrating the configuration of an exemplary wireless communication system.
Figure 2:
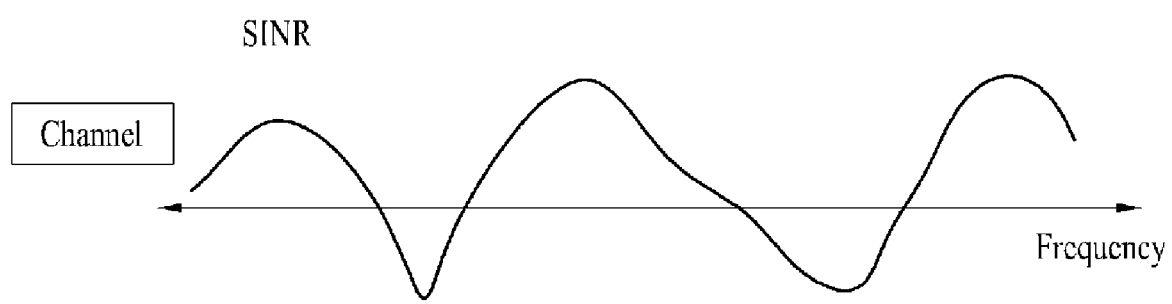
FIG. 2 illustrates an exemplary channel change in frequency in the wireless communication system.
Figure 3:
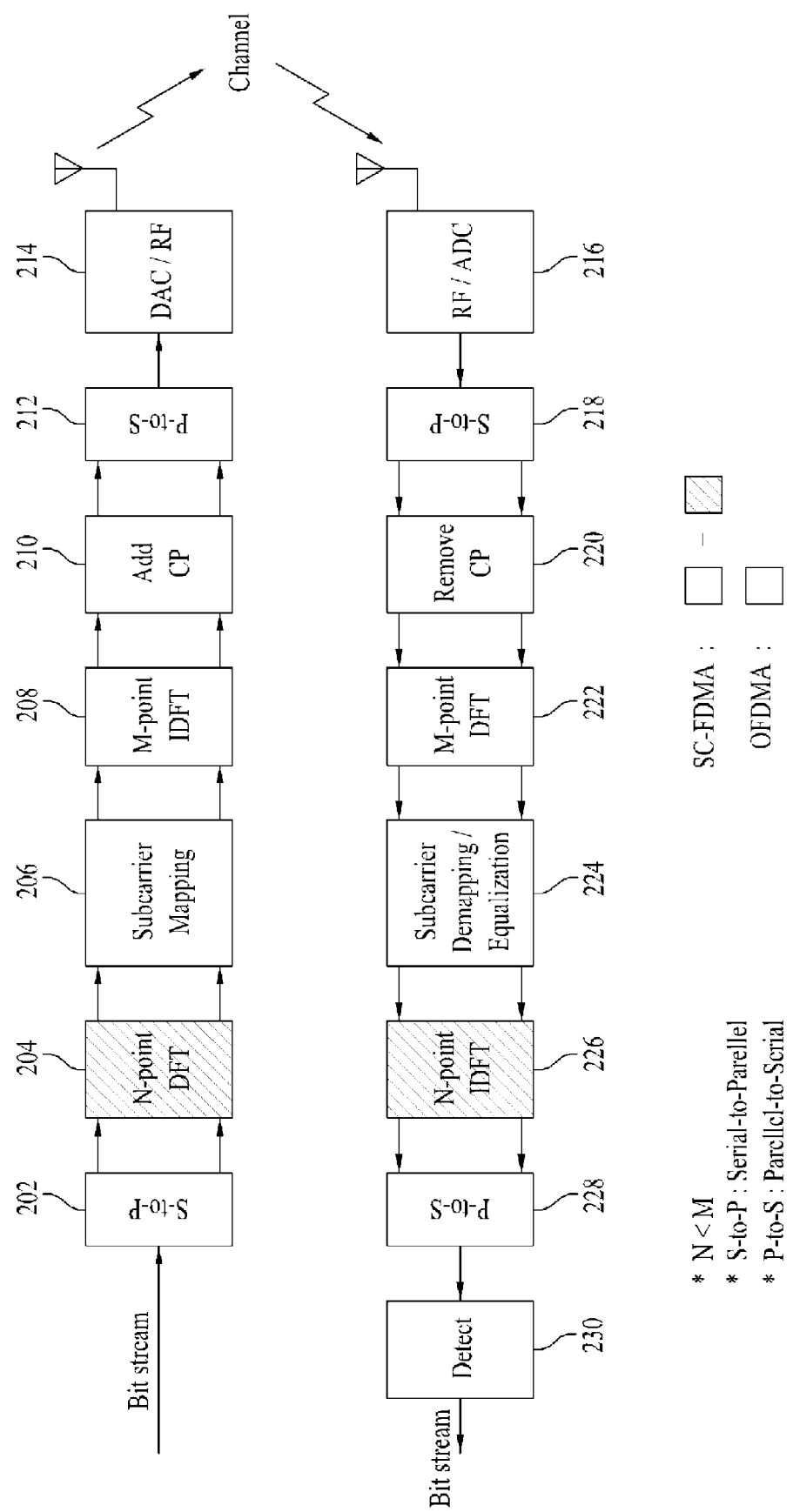
FIG. 3 is a block diagram of an exemplary Orthogonal Frequency Division Multiple Access (OFDMA) transmitter and receiver and an exemplary Single Carrier-Frequency Division Multiple Access (SC-FDMA) transmitter and receiver.

FIG. 3 is a block diagram of an exemplary Orthogonal Frequency Division Multiple Access (OFDMA) transmitter and receiver and an exemplary Single Carrier-Frequency Division Multiple Access (SC-FDMA) transmitter and receiver. In an uplink, a transmitter may be part of a User Equipment (UE) and a receiver may be part of a Base Station (BS). In a downlink, the transmitter may be part of the BS and the receiver may be part of the UE.

Referring to FIG. 3, the OFDMA transmitter includes a Serial-to-Parallel (S-to-P) converter 202, a subcarrier mapper 206, an M-point Inverse Discrete Fourier Transform (IDFT) processor 208, a Cyclic Prefix (CP) adder 210, a Parallel-to-Serial (P-to-S) converter 212, and a Digital-to-Analog Converter/Radio Frequency (DAC/RF) module 214.

The OFDMA transmitter processes a signal in the following manner. First, a bit stream is modulated to a data symbol sequence. The bit stream may be obtained by subjecting a data block received from a Medium Access Control (MAC) layer to various processes including channel encoding, interleaving, scrambling, etc. The bit stream, which is equivalent to the data block from the MAC layer, may also be referred to as a codeword. The data block from the MAC layer is also known as a transport block. The modulation may be performed in a modulation scheme such as, but not limited to, Binary Phase Shift Keying (BPSK), Quadrature Phase Shift Keying (QPSK), or n-ary Quadrature Amplitude Modulation (n-QAM). Then the S-to-P converter 202 converts the serial data symbol sequence to N parallel data symbol sequences. The subcarrier mapper 206 maps N data symbols to N subcarriers allocated from among a total of M subcarriers and pads the remaining (M-N) subcarriers with 0s. The M-point IDFT processor 208 converts the data symbols mapped to a frequency area to a time-domain sequence by M-point IDFT. The CP adder 210 generates an OFDMA symbol by adding a CP to the time-domain sequence to reduce Inter-Symbol Interference (ISI) and Inter-Carrier Interference (ICI). The P-to-S converter 212 serializes the OFDMA symbol. The DAC/RF module 214 converts the serial OFDMA symbol to an analog signal, upconverts the frequency of the analog signal, and transmits the upconverted signal to the OFDMA receiver. Among the remaining (M-N) subcarriers, available subcarriers are allocated to another user.

The OFDMA receiver includes a Radio Frequency/Analog-to-Digital Converter (RF/ADC) module 216, an S-to-P converter 218, a CP remover 220, an M-point Discrete Fourier Transform (DFT) processor 222, a subcarrier demapper/equalizer 224, a P-to-S converter 228, and a detector 230. The OFDMA receiver processes a received signal in the reverse order of the operation of the OFDMA transmitter.

Meanwhile, the SC-FDMA transmitter includes an N-point DFT processor 204 at a front end of the subcarrier mapper 206 in addition to the components of the OFDMA transmitter. The SC-FDMA transmitter may reduce the Peak-to-Average Power Ratio (PAPR) of a transmission signal considerably by spreading a plurality of data symbols across a frequency area before IDFT, compared to OFDMA.

The SC-FDMA receiver includes an N-point IDFT processor 226 at a rear end of the subcarrier demapper/equalizer 224 in addition to the components of the OFDMA receiver. The SC-FDMA receiver processes a received signal in the reverse order of the operation of the SC-FDMA transmitter.

The components illustrated in FIG. 3 are a mere exemplary application. The transmitters and/or receivers may further include a required component, some of their components/functions may be omitted, a single component may be separated into different components, and two or more components may be incorporated into a single component.

Figure 4:
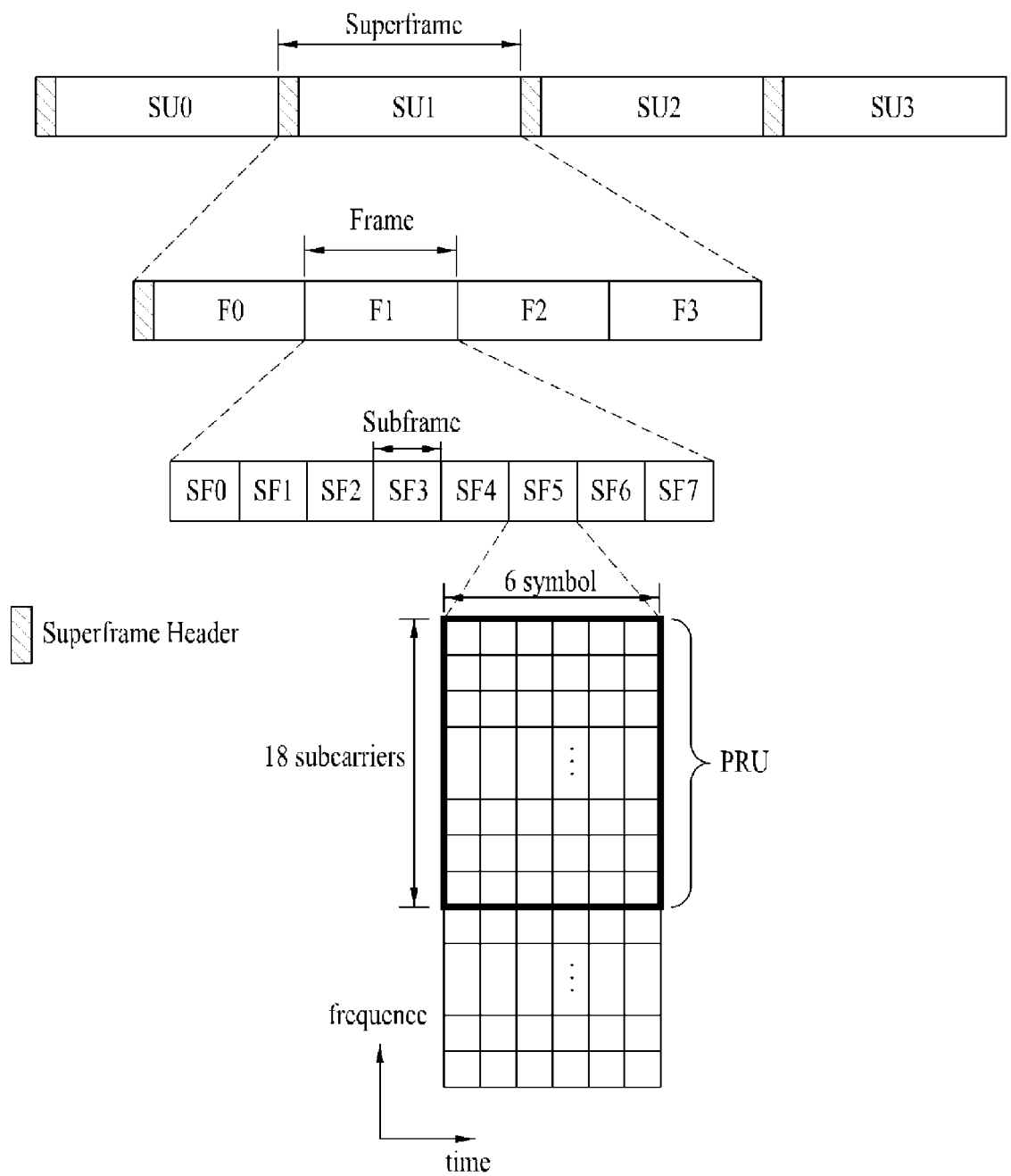
FIG. 4 illustrates an exemplary radio frame structure in an Institute of Electrical and Electronics Engineers (IEEE) 802.16m system.

FIG. 4 illustrates an exemplary radio frame structure in an IEEE 802.16m system. The frame structure may be applied to Frequency Division Duplex (FDD), Half-FDD (H-FDD), Time Division Duplex (TDD), etc.

Referring to FIG. 4, 20-ms superframes SU0 to SU3 supporting 5-MHz, 8.75-MHz, and 10-MHz bandwidths are defined in the radio frame structure. Each superframe includes four frames F0 to F3 of the same size 5 ms and starts with a SuperFrame Header (SFH). The SFH delivers essential system parameters and system configuration information. The SFH may reside in the first subframe. SFHs may be classified into a Primary SFH (P-SFH) and a Secondary SFH (S-SFH). The P-SFH is transmitted in every superframe, and the SFH may be transmitted in every superframe. The SFH may include a broadcast channel.

A frame includes eight subframes SF0 to SF7 which are allocated for downlink and uplink transmissions. Each subframe includes a plurality of Orthogonal Frequency Division Multiplexing (OFDM) symbols in time and a plurality of subcarriers in frequency. The OFDM symbols may be called OFDMA symbols, SC-FDMA symbols, or the like depending on a used multiple access scheme. The number of OFDM symbols included in a subframe may vary according to a channel bandwidth and a CP length. Subframe types may be defined according to the number of OFDM symbols included in a subframe. For instance, it may be defined that a type-1 subframe includes six OFDM symbols, a type-2 subframe includes seven OFDM symbols, a type-3 subframe includes five OFDM symbols, and a type-4 subframe includes nine OFDM symbols. One subframe may include subframes of the same type or different types.

An OFDM symbol includes a plurality of subcarriers and the number of subcarriers is determined by a Fast Fourier Transform (FFT) size. Subcarriers may be categorized into data subcarriers used for data transmission, pilot subcarriers used for channel measurement, a guard band, and null subcarriers for Direct Current (DC) components. The OFDM symbol is characterized by the parameters of BW, $N_{used}$, n, G, etc. BW represents a nominal channel bandwidth, $N_{used}$ represents the number of subcarriers used for signal transmission, n is a sampling factor that determines a subcarrier spacing and a useful symbol time along with BW and $N_{used}$, and G represents a ratio of a CP time to the useful symbol time.

Table 1 below lists an example of OFDMA parameters.

TABLE 1

| | | | | | | |
|---|---|---|---|---|---|---|
| The nominal channel bandwidth, BW (MHz) | | 5 | 7 | 8.75 | 10 | 20 |
| Sampling factor, n | | 28/25 | 8/7 | 8/7 | 28/25 | 28/25 |
| Sampling frequency, $F_s$ (MHz) | | 5.6 | 8 | 10 | 11.2 | 22.4 |
| FFT size, $N_{FFT}$ | | 512 | 1024 | 1024 | 1024 | 2048 |
| Subcarrier spacing, $\Delta f$ (kHz) | | 10.94 | 7.81 | 9.77 | 10.94 | 10.94 |
| Useful symbol time, $T_b$ (μs) | | 91.4 | 128 | 102.4 | 91.4 | 91.4 |
| CP ratio, G = ⅛ | OFDMA symbol time, $T_s$ (μs) | 102.857 | 144 | 115.2 | 102.857 | 102.857 |

TABLE 1-continued

|  |  |  |  |  |  |  |  |
|---|---|---|---|---|---|---|---|
|  | FDD | Number of OFDMA symbols per 5 ms frame | 48 | 34 | 43 | 48 | 48 |
|  |  | Idle time (μs) | 62.857 | 104 | 46.40 | 62.857 | 62.857 |
|  | TDD | Number of OFDMA symbols per 5 ms frame | 47 | 33 | 42 | 47 | 47 |
|  |  | TTG + RTG (μs) | 165.714 | 248 | 161.6 | 165.714 | 165.714 |
| CP ratio, G = 1/16 |  | OFDMA symbol time, $T_s$ (μs) | 97.143 | 136 | 108.8 | 97.143 | 97.143 |
|  | FDD | Number of OFDMA symbols per 5 ms frame | 51 | 36 | 45 | 51 | 51 |
|  |  | Idle time (μs) | 45.71 | 104 | 104 | 45.71 | 45.71 |
|  | TDD | Number of OFDMA symbols per 5 ms frame | 50 | 35 | 44 | 50 | 50 |
|  |  | TTG + RTG (μs) | 142.853 | 240 | 212.8 | 142.853 | 142.853 |
| CP ratio, G = 1/4 |  | OFDMA symbol time, $T_s$ (μs) | 114.286 | 160 | 128 | 114.286 | 114.286 |
|  | FDD | Number of OFDMA symbols per 5 ms frame | 43 | 31 | 39 | 43 | 43 |
|  |  | Idle time (μs) | 85.694 | 40 | 8 | 85.694 | 85.694 |
|  | TDD | Number of OFDMA symbols per 5 ms frame | 42 | 30 | 38 | 42 | 42 |
|  |  | TTG + RTG (μs) | 199.98 | 200 | 136 | 199.98 | 199.98 |
| Number of Guard Sub-Carriers | Left |  | 40 | 80 | 80 | 80 | 160 |
|  | Right |  | 39 | 79 | 79 | 79 | 159 |
| Number of Used Sub-Carriers |  |  | 433 | 865 | 865 | 865 | 1729 |
| Number of Physical Resource Unit (18 × 6) in a type-1 sub-frame. |  |  | 24 | 48 | 48 | 48 | 96 |

A subframe includes a plurality of Physical Resource Units (PRUs) in the frequency domain. A PRU is a basic unit for resource allocation, including a plurality of contiguous OFDM symbols in the time domain by a plurality of contiguous subcarriers in the frequency domain. For example, the number of OFDM symbols in a PRU may be equal to that of OFDM symbols in a subframe. Therefore, the number of OFDM symbols in a PRU may be determined by the type of a subframe. In the mean time, the PRU may have 18 subcarriers. Then the PRU may be comprised of 6 OFDM symbols by 18 subcarriers. There are two types of PRUs according to the type of resource allocation, Distributed Resource Unit (DRU) for distributed resource allocation and Contiguous Resource Unit (CRU) for localized resource allocation.

The foregoing structure is an exemplary application. Hence, a superframe length, the number of frames included in a superframe, the number of subframes included in a frame, the number of OFDMA symbols included in a subframe, parameters for an OFDMA symbol, etc. may vary. For example, the number of subframes in a frame may be changed according to a channel bandwidth, a CP length, etc.

Figure 5:
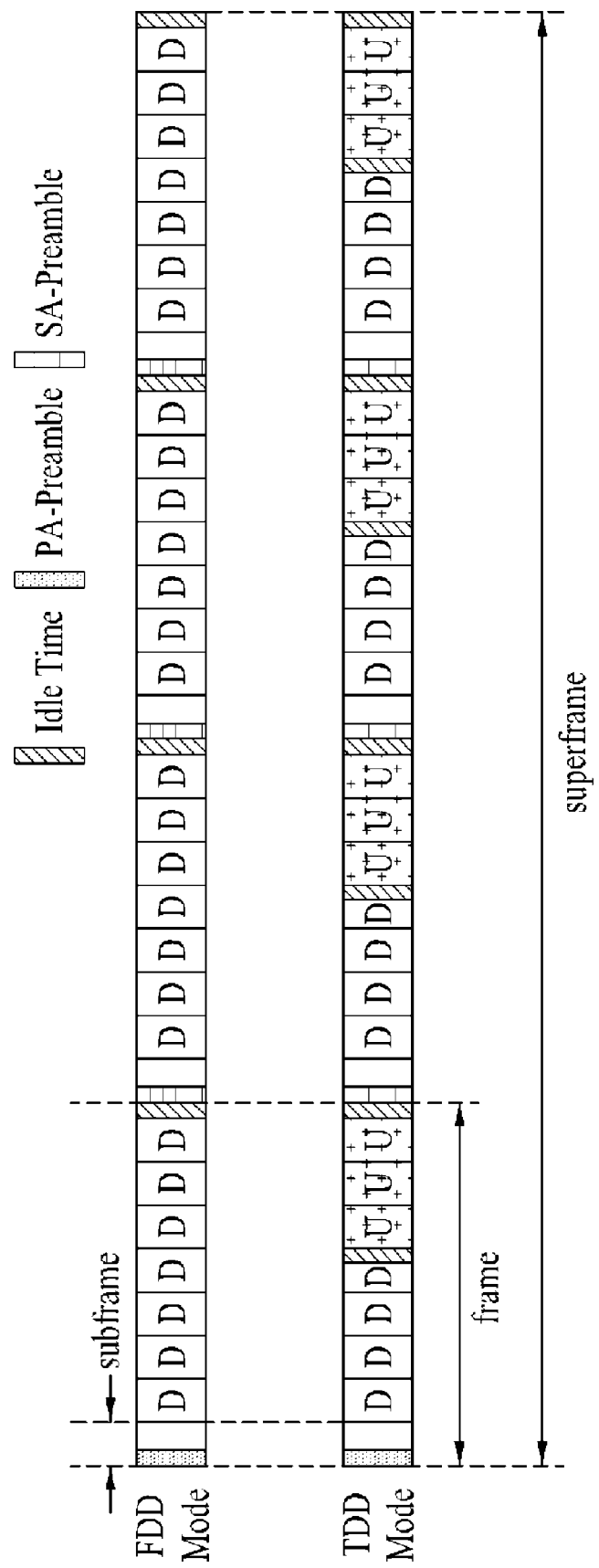
FIG. 5 illustrates superframe structures for duplex modes in the IEEE 802.16m system.

FIG. 5 illustrates superframe structures for duplex modes in the IEEE 802.16m system. In an embodiment of the present invention, an IEEE 802.116m only mode is assumed.

Referring to FIG. 5, since downlink transmission is distinguished from uplink transmission by frequency in FDD mode, a frame includes only downlink subframes D or uplink subframes U. In the FDD mode, an idle time may be defined at the end of every frame. In contrast, downlink transmission is distinguished from uplink transmission by time in TDD mode. Thus, the subframes of a frame are divided into downlink subframes D and uplink subframes U. For switching from the downlink to the uplink, a transition gap called Transmit/receive Transition Gap (TTG) is defined between a downlink subframe and its subsequent uplink subframe. For switching from the uplink to the downlink, a transition gap called Receive/transmit Transition Gap (RTG) is defined between an uplink subframe and its subsequent downlink subframe. In the IEEE 802.16m system, there are two types of downlink Synchronization Channels (SCHs), Primary SCH (P-SCH) And Secondary SCH (S-SCH). The P-SCH carriers a Primary Advanced (PA)-preamble and the S-SCH carriers a Secondary Advanced (SA)-preamble. The PA-preamble is used for time/frequency synchronization and acquisition of information such as a partial cell ID, system information, etc. The SA-preamble is used to acquire a final physical cell ID. Also, the SA-preamble may serve the purpose of measuring a Received Signal Strength Indication (RSSI) or the like.

Figure 6:
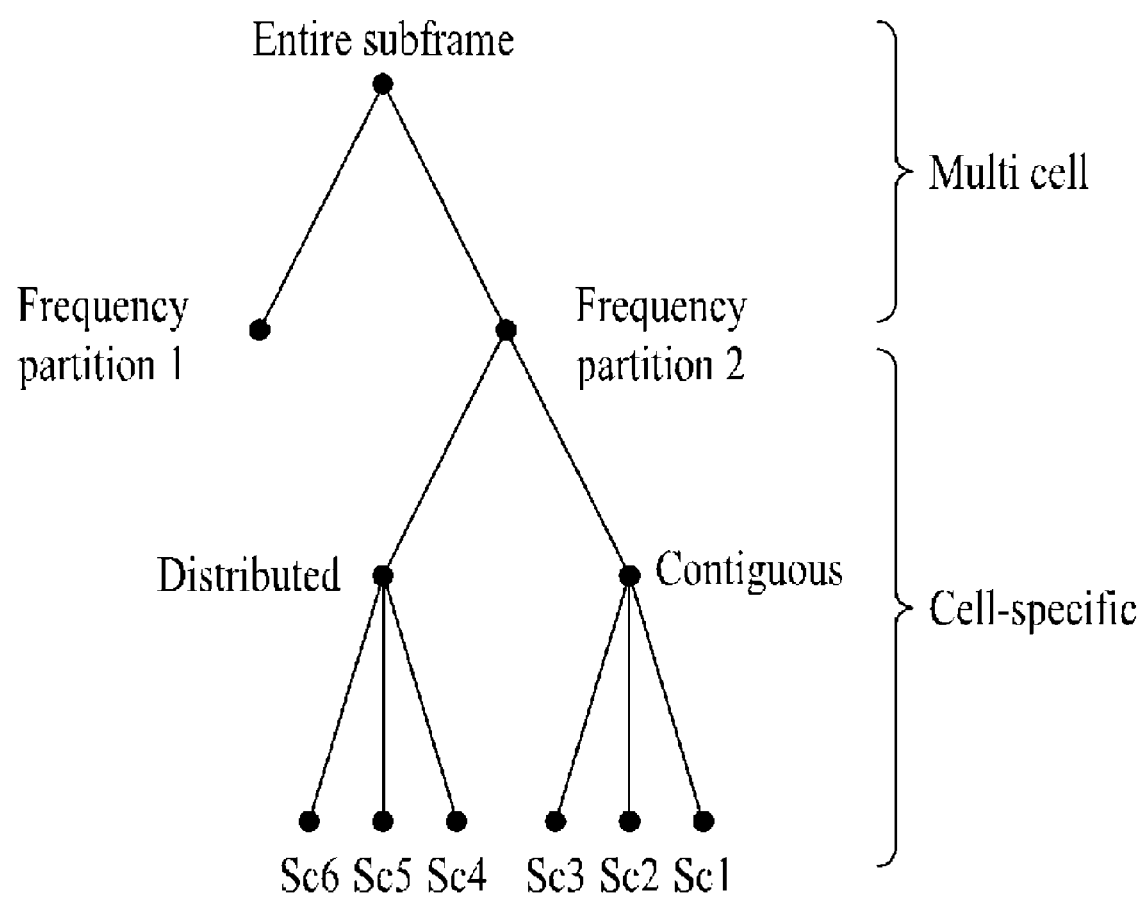
FIG. 6 illustrates an exemplary physical structure of a subframe in the IEEE 802.16m system.

FIG. 6 illustrates an exemplary physical structure of a subframe in the IEEE 802.16m system.

Referring to FIG. 6, a subframe may be divided into at least one Frequency Partition (FP). A subframe is divided into two FPs in the illustrated case of FIG. 6, to which the number of FPs is not limited. The FP may be used for Fractional Frequency Reuse (FFR).

Each FP includes at least one PRU. Distributed resource allocation and/or contiguous resource allocation may be applied to the FP. A Logical Resource Unit (LRU) is a basic logical unit for distributed and contiguous (localized) resource allocations. A Logical Distributed Resource Unit (LDRU) includes a plurality of subcarriers Sc distributed across a frequency band. The size of an LDRU is equal to that of a PRU. The LDRU is also called a Distributed LRU (DLRU). A Logical Contiguous Resource Unit (LCRU) includes contiguous subcarriers Sc. The size of a LCRU is also equal to that of a PRU. The LCRU is also called a Contiguous LRU (CLRU).

Figure 7:
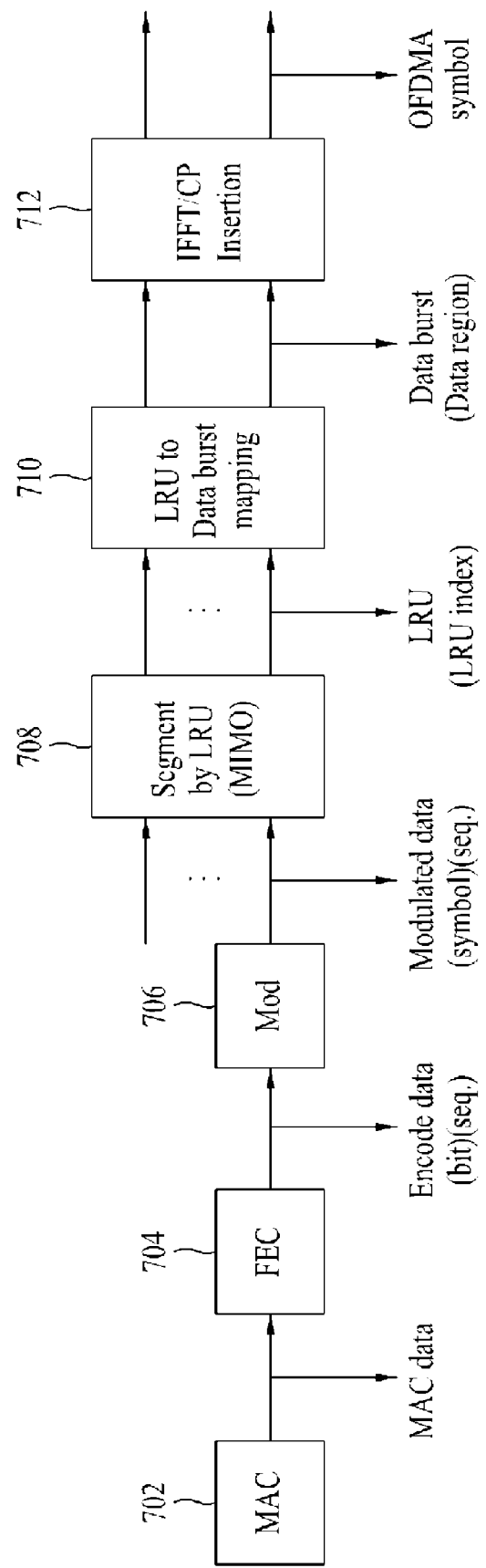
FIG. 7 is a block diagram of an exemplary transmission chain in the IEEE 802.16m system.

FIG. 7 is a block diagram of an exemplary transmission chain in the IEEE 802.16m system.

Referring to FIG. 7, a MAC block 702 configures MAC data with data received from an upper layer. The MAC data is scheduled on a TTI basis. The MAC data is also called a transport block which corresponds to a codeword in a subsequent process. A Forward Error Correction (FEC) block 704 channel-encoded the MAC data according to a channel coding scheme. The channel coding scheme may be Turbo Coding (TC), Convolutional Turbo Coding (CTC), Low Density Parity Check (LDPC) coding, etc., which should not be construed as limiting the scope of the present invention. The coded data may be referred to as a codeword or coded packet data. A Modulation (Mod) block 706 modulates the coded data according to a modulation scheme such as n-ary Phase Shift Keying (n-PSK), n-QAM, or the like (n is an integer), to which the present invention is not limited. An LRU allocation block 708 divides the modulation symbols into segments, each of which has an LRU size, and allocates the segments to LRUs. A mapping block 710 maps the LRUs to data bursts. The data bursts are allocated to PRUs in the physical frequency domain. Hence, the mapping block 710 functions to map the modulated data to subcarriers according to a mapping relationship between LRUs and PRUs. An Inverse Fast Fourier Transform/Cyclic Prefix (IFFT/CP) block 710 converts the frequency-domain signal to a time-domain signal by IFFT and generates an OFDMA symbol by adding a CP to the time-domain signal.

Figure 8:
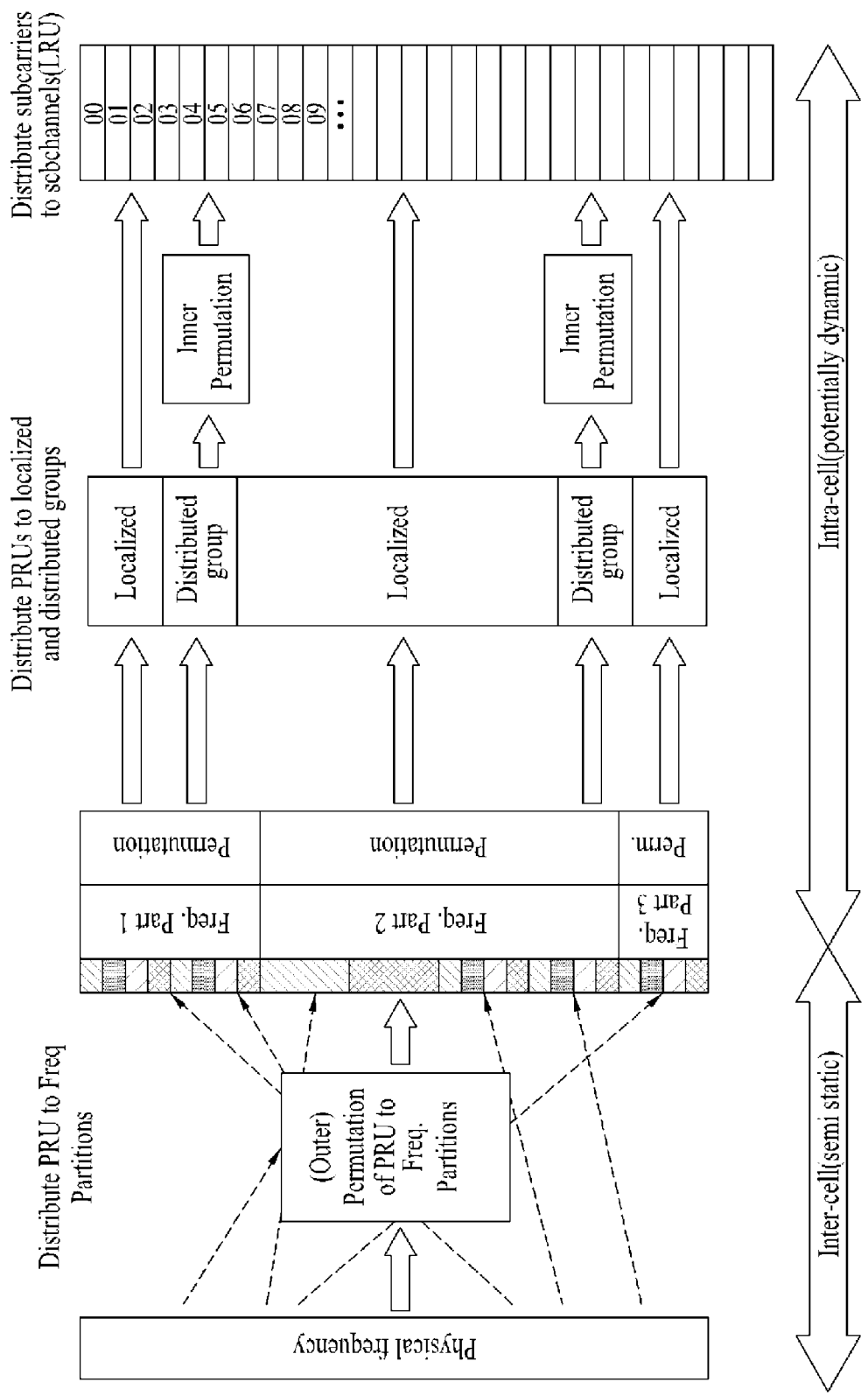
FIG. 8 illustrates an exemplary operation for mapping resource units.

FIG. 8 illustrates an exemplary operation for mapping resource units.

Referring to FIG. 8, outer permutation may be performed for physical frequency resources. The outer permutation applies in units of at least one PRU. The outer permutation may be implemented in units of N1 or N2 PRUs (N1>N2) and N1 and N2 may vary depending on a bandwidth. One thing to note herein is that N1 needs to be an integer multiple of N2, for efficient outer permutation. The outer permutation may be the process of dividing PRUs into SubBand (SB) PRUs, $PRU_{SB}$ and MiniBand (MB) PRUs, $PRU_{MB}$, like subband segmentation and miniband permutation, and permuting the MB PRUs on a PRU basis. The SB PRUs, $PRU_{MB}$ are to be allocated to a subband, whereas MB PRUs, $PRU_{MB}$ are to be allocated to minibands. N1 is the number of PRUs included in a subband and N2 is the number of PRUs in a miniband.

The reordered PRUs are distributed to FPs. Each FP is divided into LCRUs and LDRUs. Sector-specific permutation may be supported and direct resource mapping may be supported for contiguous (i.e. localized) resources. The size of distributed/localized resources may be flexibly set in each sector.

Then, the distributed groups and localized groups are mapped to LRUs. Inner permutation (or subcarrier permutation) defined for distributed resource allocation distributes subcarriers over total distributed resources. There is no inner permutation for contiguous resource allocation. PRUs are directly mapped to CRUs in each FP.

Meanwhile, an FFR scheme may be used. According to the FFR scheme, a total frequency band is divided into a plurality of FPs and an FP is allocated to each cell. Different FPs may be allocated to adjacent cells and the same FP to cells remote from each other by the FFR scheme. As a consequence, intercell interference may be reduced and the performance of UEs at a cell edge may be increased.

Figure 9:
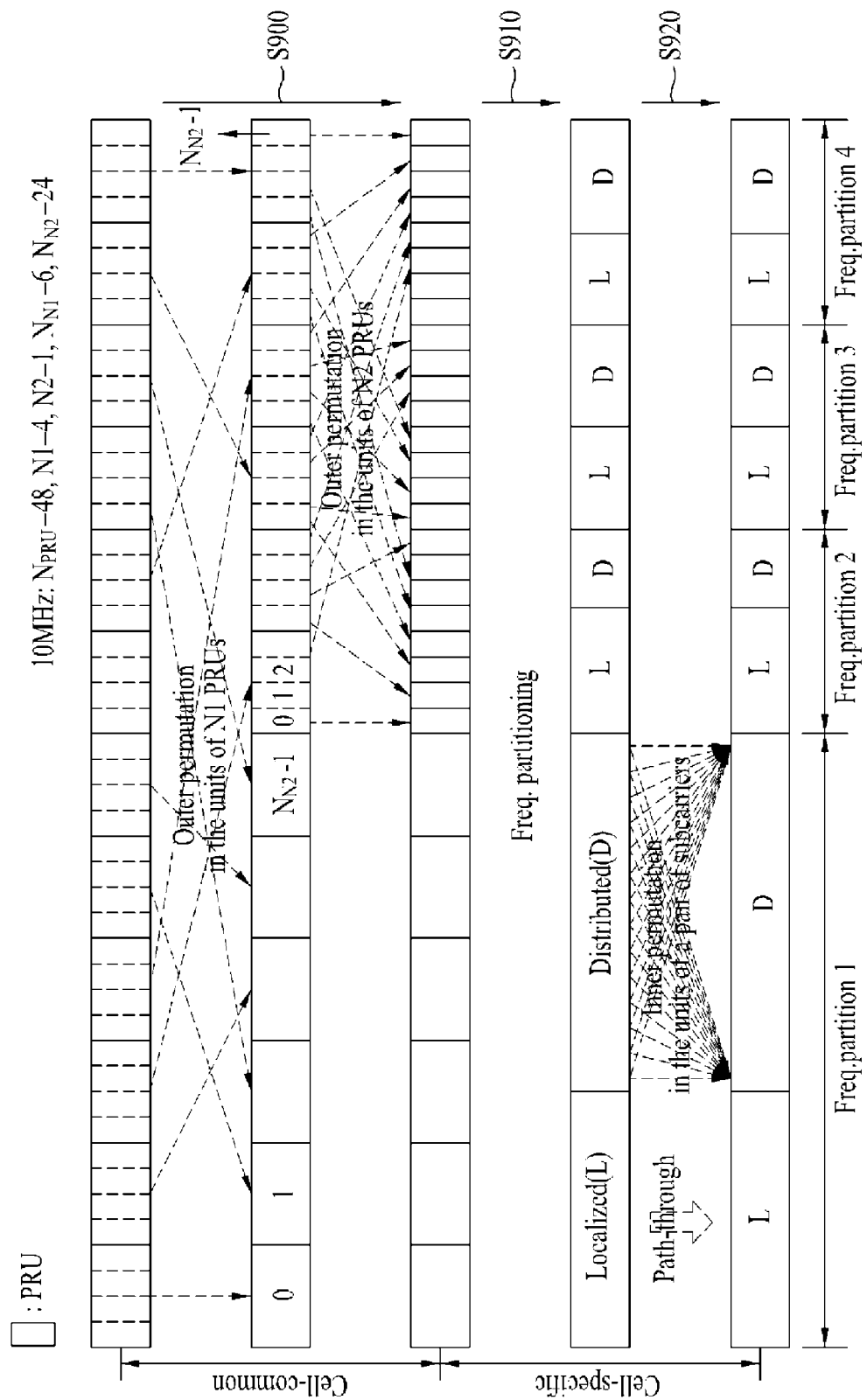
FIG. 9 illustrates an exemplary subchannelization operation.

FIG. 9 illustrates an exemplary subchannelization operation. For subchannelization, there are certain factors to be considered, for example, inclusive of DRU and CRU performance, signaling overhead for resource allocation, the overhead of Channel Quality Indicator (CQI) feedback, the flexibility of a ratio between distributed resources and localized resources, the readiness of scaling based on a bandwidth (BW), the easiness of designing a resource allocation sequence, the easiness of FFR setting, etc. For notational simplicity, it is assumed that a total frequency band is 10 MHz, there are 48 PRUs in total, N1 is 4, the number of subbands with a granularity of N1, $N_{N1}$ is 6, N2 is 1, and the number of minibands with a granularity of N2, $N_{N2}$ is 24.

Referring to FIG. 9, physical areas, PRUs are divided into logical areas, SB PRUs or MB PRUs by outer permutation with a granularity of N2, and the MB PRUs are permuted with a granularity of N2 in step S900.

In step S910, the SB PRUs or the MB PRUs are distributed to FPs and localized resources L are distinguished from distributed resources D in each FP by permutation. The step of distributing the SB PRUs or the MB PRUs to FPs may be incorporated into or implemented independently of the outer permutation in step S900. In the case of the independent operation of PRU distribution to FPs, it may be performed based on FP information broadcast in an SFH, or according to a separately established distribution rule. To achieve a diversity gain from the distributed resources, inner permutation is additionally performed for the distributed resources in step S920.

FIGS. 10A, 10B and 10C illustrate an exemplary permutation based on block interleaving. The block interleaving may involve row-wise index writing, intra-row permutation, intra-column permutation, and column-wise index reading. The order of performing the steps is shown by way of example, and thus it may be changed freely.

With reference to FIGS. 10A, 10B and 10C, block interleaving of resource indexes 0 to 40 will be described, by way of example. Each resource index indicates a basic resource to be interleaved and basic resources may be neighboring to each other in the frequency domain.

FIG. 10A illustrates a result of writing the resource indexes 0 to 40 in an interleaving matrix in a row-wise direction, to which the present invention is not limited. The row-wise writing may be followed by intra-row permutation of the interleaving matrix. The intra-row permutation may be performed according to a permutation pattern shared between a transmitter and a receiver. FIG. 10B(a) illustrates an example of intra-row permutation pattern taking the form of a matrix. In another example, the intra-row permutation may be performed using a base permutation sequence of length 5. In an embodiment of the present invention, the base permutation sequence is, for example, [0, 3, 1, 4, 2].

FIG. 10B(b) illustrates the result of the intra-row permutation. It is noted from FIG. 10B(b) that the resource indexes are mixed in each row by the intra-row permutation.

After the intra-row permutation, intra-column permutation may be applied to the interleaving matrix. The intra-column permutation may be performed according to a permutation pattern shared between the transmitter and the receiver. FIG. 10C(a) illustrates an example of intra-column permutation pattern taking the form of a matrix. In another example, the intra-row permutation may be performed using a base permutation sequence of length 8. In an embodiment of the present invention, the base permutation sequence is, for example, [0, 5, 2, 7, 4, 1, 6, 3].

FIG. 10C(b) illustrates the result of the intra-column permutation. It is noted from FIG. 10C(b) that the resource indexes are mixed in each column by the intra-column permutation. After the intra-column permutation, the resource indexes written in the interleaving matrix are read column by column, i.e. in a column-wise direction. As a consequence, the sequence of the original resource indexes [0, 1, 2, 3, 4, 5, . . . , 40] is permuted to [0, 25, 11, 36, 22, 8, . . . , 38].

The resources of a distributed resource area may be effectively mixed and distributed through the block interleaving.

Accordingly, signal transmission in predetermined resources that are block-interleaved may lead to a sufficient frequency diversity gain. However, conventionally, no consideration is given to time in a permutation pattern for block interleaving and thus a block interleaving output pattern is always the same. Therefore, the conventional block interleaving effectively distributes frequency resources in a given area, but relatively identical frequency resources are adjacent to each other in the time domain all the time. A regular arrangement of resources in the time domain reduces interference randomization, thus degrading system performance.

Embodiment

Resource Permutation Based on Time Parameter

Figure 11:
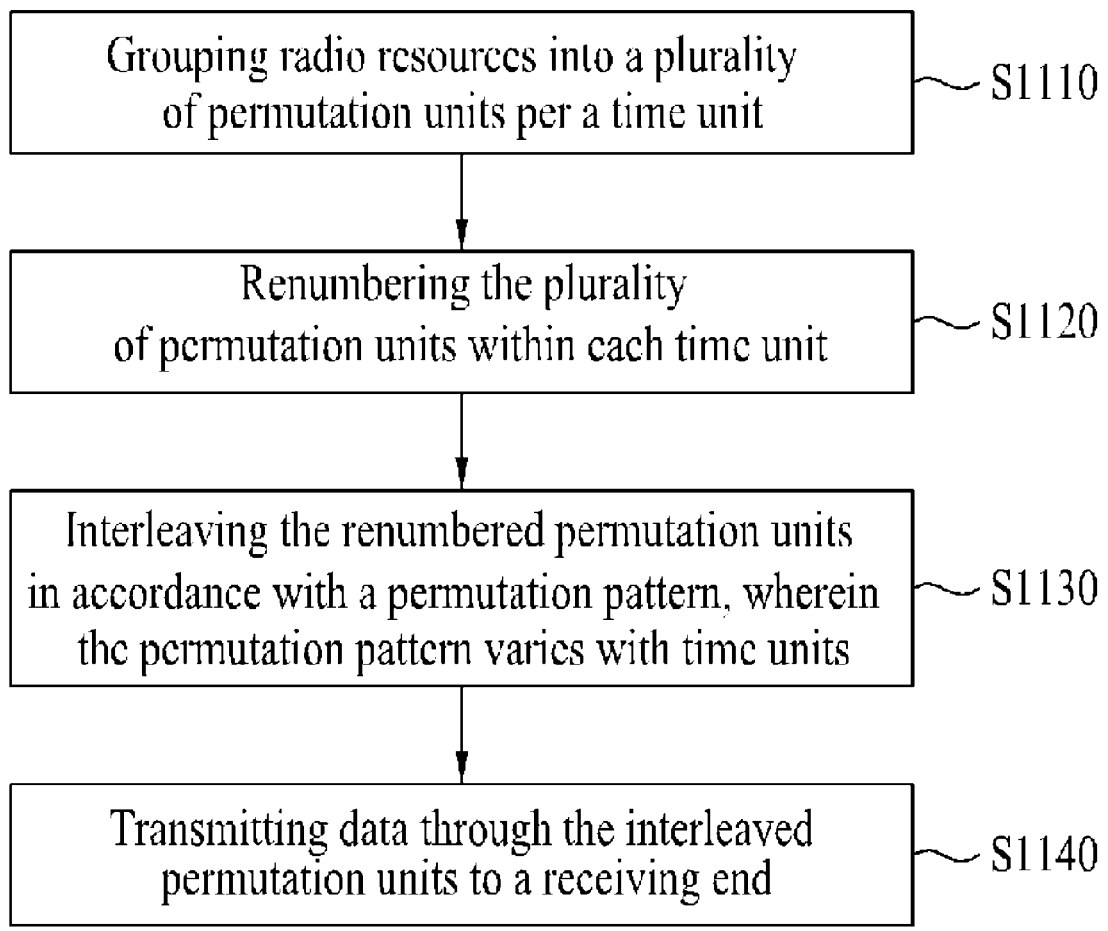
FIG. 11 is a flowchart illustrating an operation for performing permutation, taking time into account and transmitting data in distributed resources according to an embodiment of the present invention.

FIG. 11 is a flowchart illustrating an operation for performing permutation, taking time into account and transmitting data in distributed resources according to an embodiment of the present invention.

Referring to FIG. 11, radio resources may be grouped into a plurality of permutation units on a time unit basis in step S1110. The radio resources may include at least part of a system band. The permutation unit is a basic interleaving unit which may include one or more subcarriers. The time unit for permutation may include one OFDMA symbol or a multiple of OFDMA symbol. The plurality of permutation units may be renumbered within each time unit in step S1120. The renumbered permutation units are interleaved according to a permutation pattern. In this case, the block interleaving scheme illustrated in FIGS. 10A, 10B and 10C is available. Instead, a permutation sequence for interleaving may be used. Notably, the permutation pattern for interleaving varies with time units in step S1130. For example, the time parameter-based permutation may be carried out by use of at least one of time-variant intra-row permutation and time-variant intra-column permutation. Therefore, when data is transmitted using a plurality of frequency resources by a plurality of time resources, the transmitter may be able to mix and distribute resources for data transmission in the frequency domain in a time-variant form. Then the transmitter may transmit data through the interleaved resources to the receiver in step S1140.

FIG. 12 illustrates an exemplary permutation that is performed taking time into account according to the embodiment of the present invention.

Referring to FIG. 12, it is noted that a block interleaving pattern varies with time t. In an embodiment of the present invention, resource indexes are shifted downward by three rows during intra-column permutation as time t passes (refer to resource indexes marked with slashed lines). In another example, time t may affect intra-row permutation or both the intra-row permutation and the intra-column permutation. Also, time t may affect a permutation pattern in various ways such as shifting, masking, etc.

Now a detailed description will be made of applications of an embodiment of the present invention by inner permutation applied to downlink DRUs.

Figure 13:
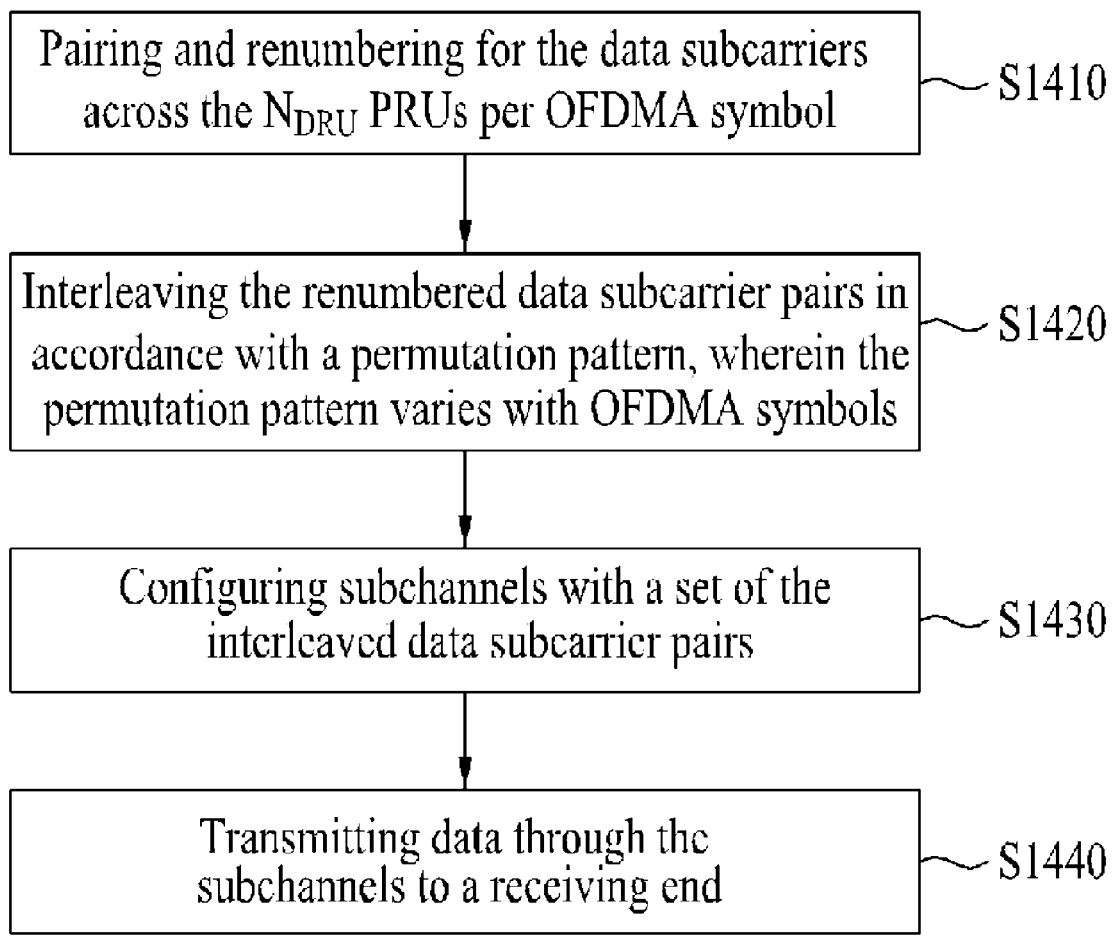
FIG. 13 is a flowchart illustrating an operation for performing inner permutation, taking time into account and transmitting data in distributed resources according to an embodiment of the present invention.

FIG. 13 is a flowchart illustrating an operation for performing inner permutation, taking time into account and transmitting data in distributed resources according to an embodiment of the present invention.

Referring to FIG. 13, data subcarriers in distributed resources may be paired on an OFDMA symbol basis and the entire data subcarrier pairs may be renumbered with new indexes in step S1410. The distributed resources may include one or more PRUs (i.e. DRUs). The renumbered data subcarrier pairs are interleaved in a permutation pattern. In this case, the block interleaving scheme illustrated in FIGS. 10A, 10B and 10C is available. Instead, a permutation sequence for interleaving may be used. Notably, the permutation pattern varies with OFDMA symbols in step S1420. For example, the time parameter-based permutation may be carried out by use of at least one of time-variant intra-row permutation and time-variant intra-column permutation. Therefore, when data is transmitted through one or more PRUs, the transmitter may be able to mix and distribute resources for data transmission in the frequency domain, in a time-variant form. Then the transmitter may configure downlink subchannels using both the interleaved data subcarrier pairs and pilot subcarriers at their original positions in step S1420. The downlink subchannels correspond to LRUs. Then the transmitter may transmit data in the subchannels to the receiver in step S1440.

Figure 14:
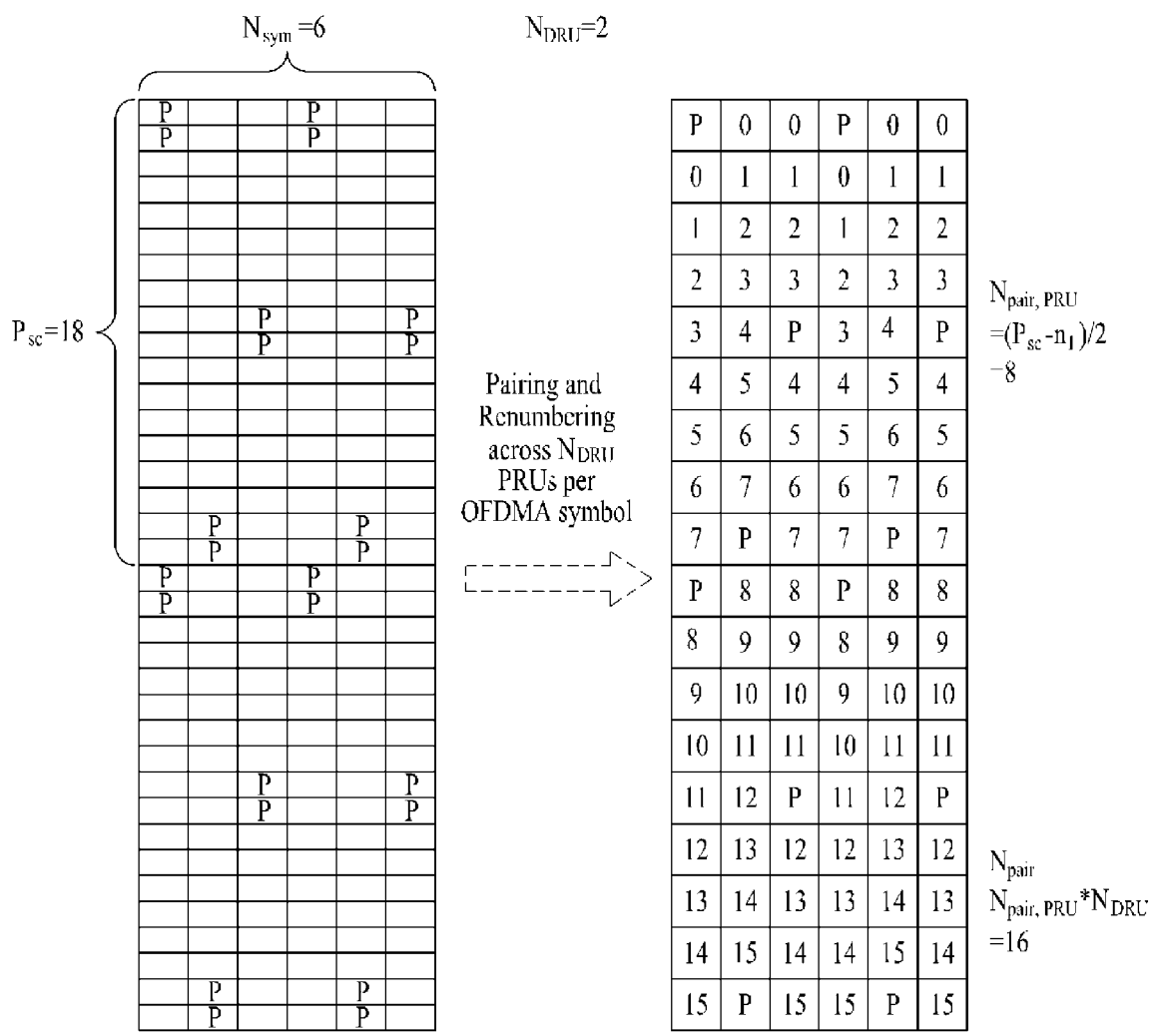
FIG. 14 illustrates an exemplary operation for dividing downlink Distributed Resource Units (DRUs) into permutation units.

FIG. 14 illustrates an exemplary operation for dividing downlink DRUs into permutation units.

Referring to FIG. 14, one DRU includes 18 subcarriers ($P_{SC}=18$) by 6 OFDMA symbols ($N_{sym}=6$). A predetermined number of resource elements at predetermined positions are used for pilot transmission and the remaining resource elements are available for data transmission in the DRU. In the embodiment of the present invention, two contiguous subcarriers are used for pilot transmission in each OFDMA symbol, by way of example. Instead, the pilot subcarriers may be apart from each other. Inner permutation is carried out over one or more DRUs. The inner permutation may be performed on a subcarrier pair basis. To this end, the remaining subcarriers except the pilot subcarriers are paired and renumbered with indexes in DRUs. When two pilots are included in each OFDMA symbol of the DRUs, there are eight ($N_{pair,PRU}$) data subcarrier pairs per OFDMA symbol. The embodiment of the present invention is based on the assumption of two DRUs ($N_{DRU}=2$) and thus the total number of data subcarrier pairs is 16 ($N_{pair}=N_{pair,PRU} \times N_{DRU}$). The data subcarrier pairs are sequentially numbered 0 to 15.

One thing to note is that the inner permutation is performed over data subcarriers only, not over pilot subcarriers on the downlink. The inner permutation may be performed by the block interleaving scheme illustrated in FIGS. 10A, 10B and 10C. In this case, the interleaving matrix may be of size $N_{pair,PRU} \times N_{DRU}$. In the interleaving matrix, the row indexes m range from 0 to $N_{pair,PRU}-1$ and the column indexes n range from 0 to $N_{DRU}-1$.

Example 1

Permutation of Distributed Resources by Block Interleaving

Figure 15B:
Figure 15B:
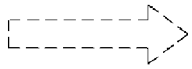
Figure 15B:
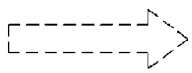
Figure 15B:
Figure 15B:
Figure 15B:
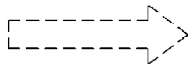
Figure 15B:
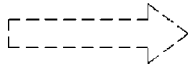
Figure 15C:
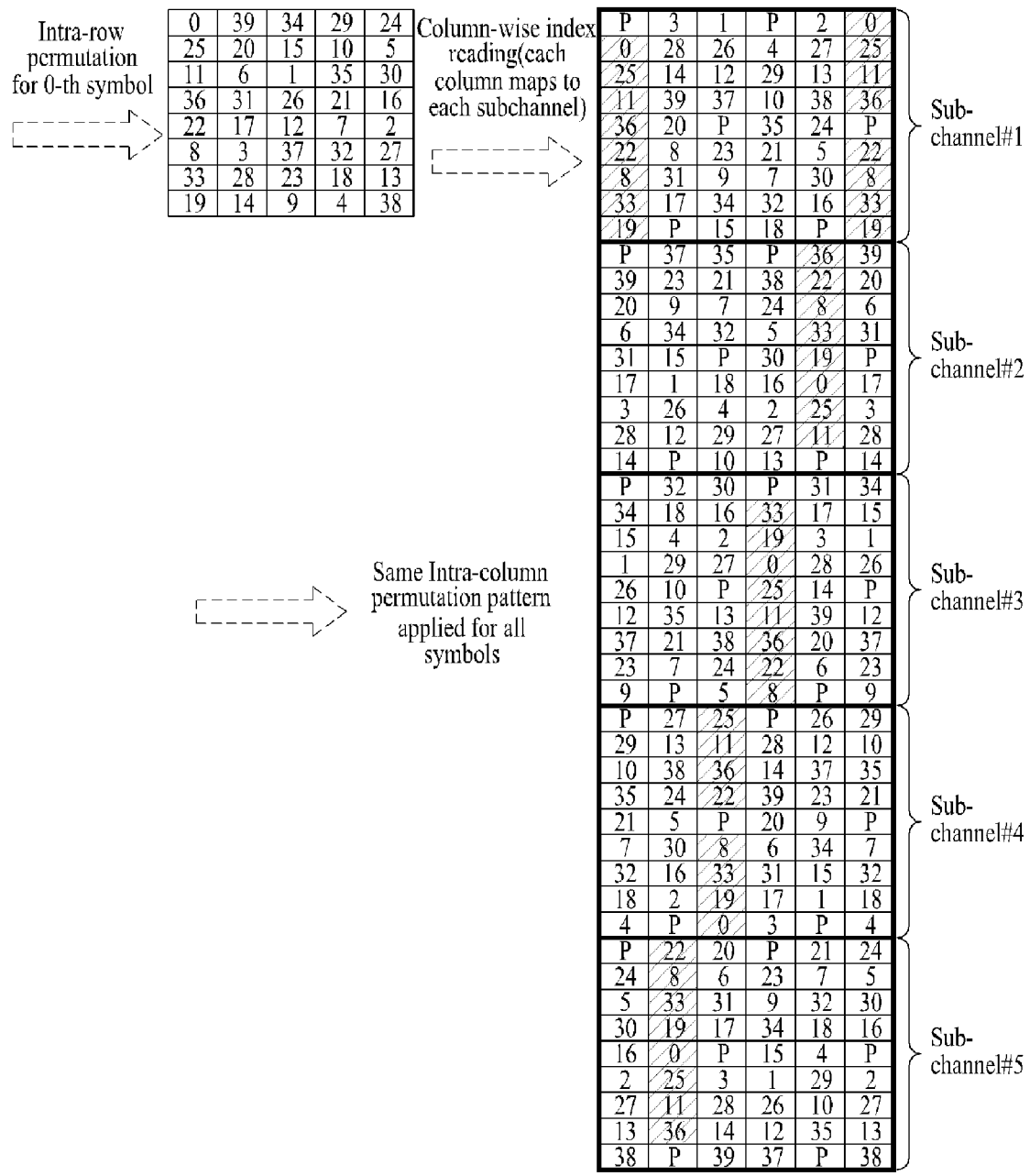

FIGS. 15A, 15B and 15C illustrate an exemplary inner permutation when $N_{DRU}=5$ according to the embodiment of the present invention. In accordance with the embodiment of the present invention, the inner permutation is carried out by the block interleaving scheme illustrated in FIGS. 10A, 10B and 10C, taking into account a time parameter (e.g. OFDMA symbol indexes).

FIG. 15A illustrates a result of pairing the total subcarriers of five DRUs on an OFDMA symbol basis and renumbering entire data subcarrier pairs with indexes. For eight data subcarrier pairs ($N_{pair,PRU}=8$) per DRU, a total of 40 data subcarrier pairs with indexes 0 to 39 are created. While pilot subcarrier pairs are denoted by P in FIG. 15A, the pilot subcarriers are excluded from the subsequent processes because the inner permutation applies only to the data subcarrier pairs.

FIG. 15B illustrates an exemplary operation for performing intra-row permutation on an OFDMA symbol basis. The permutation pattern illustrated in FIG. 10B is used for the intra-row permutation. Notably, a different permutation pattern may be created for a different OFDMA symbol index according to a predetermined method using a base permutation pattern. It is assumed herein that the base permutation pattern is a permutation pattern applied to OFDMA symbol 0. The time-variant intra-row permutation may change an inner permutation result over time. To be more specific, a permutation pattern applied to each OFDMA symbol is a cyclic shifted version of the base permutation pattern to the left by as much as the index of the OFDMA symbol in the embodiment of the present invention.

FIG. 15C illustrates an exemplary operation for performing intra-column permutation on an OFDMA symbol basis. The permutation pattern illustrated in FIG. 10C is used for the intra-column permutation. In the embodiment of the present invention, the same intra-column permutation pattern applies to all OFDMA symbols. That is, the embodiment of the present invention is based on the assumption of a time-invariant intra-column permutation. After the intra-column permutation, the indexes of the data subcarrier pairs in the interleaving matrix are read out column by column, that is, in a column-wise direction and sequentially mapped to the OFDMA symbols in subchannels (or LRUs). Because the pilot subcarriers are mapped to fixed positions, the data subcarrier pairs are mapped to positions other than those of the pilot subcarriers, when the subchannels are configured.

The above-described inner permutation is carried out by the block interleaving scheme including row-wise reading, time-variant intra-row permutation, intra-column permutation, and column-wise reading. Yet, this is a mere exemplary application and thus it should not be construed as limiting the present invention. While the time-variant inner permutation is performed using block interleaving in FIGS. 15A, 15B and 15C, it is a mere example, to which the time-variant inner permutation is not limited. Various modified examples of the time-variant inner permutation will be described below in detail.

Example 2-1

Permutation of Distributed Resources Using Sequence

Permutation may be performed for distributed resources without block interleaving in the following manner. For an $m^{th}$ subcarrier pair in an $s^{th}$ LRU of a $t^{th}$ OFDMA symbol, a permutation index R[n,m,t] (i.e. the index of a physical subcarrier pair) may be defined as [Equation 1].

$R[n,m,t]=s \times N_{DRU}+P[(n+s) \bmod N_{DRU}]$, where $s=(f_1 \times m+f_2 \times n+t) \bmod N_{pair,PRU}$ [Equation 1]

In [Equation 1], $N_{DRU}$ denotes the number of DRUs and mod denotes a modulo operation. A mod B represents the remainder of A divided by B. P[•] denotes a base permutation sequence of length $N_{DRU}$ for intra-row permutation. Each element of P[•] may range from 0 to $N_{DRU}-1$. $N_{pair,PRU}$ denotes the number of data subcarrier pairs included in one resource unit.

In [Equation 1], $f_1$ is a positive integer that is prime for $N_{pair,PRU}$. Without intra-column permutation, $f_1$ may be set to 1. $f_2$ is also a positive integer. If $f_2$ is prime for $N_{DRU}$, each column has a different intra-column permutation pattern. To use the same intra-column permutation pattern for all columns, $f_2$ may be set to 0. If the time parameter t is not used, the permutation sequence is time-invariant. [Equation 1] may be expressed as [Equation 2].

$R[n,m,t]=s \times N_{DRU}+P_s[n]$, where $s=(f_1 \times m+f_2 \times n+t) \bmod N_{pair,PRU}$ [Equation 2]

In [Equation 2], $P_s[•]$ is achieved by cyclically shifting (rotating) the base permutation sequence P[•] to the left s times.

Meanwhile, the base permutation sequence P[•] may be generated by a random sequence generation algorithm. The base permutation sequence P[•] of length L may satisfy, but not limited to, the following equation.

$(P[i+1]-P[i]) \bmod L = D$ or $D+1$ [Equation 3]

The random sequence satisfying the above condition is called an Almost Equidistance Permutation Sequence (AEPS) and permutation sequences P[i] are distributed with an almost equal distance D. When an offset O is defined for a permutation sequence, the permutation sequence starts with the value of (0 mod L). Specifically, the base permutation sequence P[•] may be defined as $P[i]=\{D \times i+O+\text{floor}(i/W)\} \bmod L$, where $i=0, 1, \ldots, L-1$ [Equation 4]

where D is a positive integer smaller than L, O denotes an offset value for a permutation sequence, and W is a window size satisfying W=L/GCD(L,D) in which GCD(L,D) represents the greatest common divisor between L and D.

For example, an AEPS may be given as
for L=14, D=6 and O=0,
  P={0,6,12,4,10,2,8,1,7,13,5,11,3,9}
for L=16, D=4 and O=3,
  P={3,7,11,15,4,8,12,0,5,9,13,1,6,10,14,2}
for L=18, D=7 and O=6,
  P={6,13,2,9,16,5,12,1,8,15,4,11,0,7,14,3,10,17}

A. Generation of Permutation Sequence Using Time-Variant Intra-Row Permutation and Time-Variant Intra-Column Permutation A time-variant intra-row permutation may also be applied to the permutation pattern generated by [Equation 2]. Then the time parameter t may be used as a shift or masking value for the intra-row permutation.

Intra-Row Permutation Using Time Parameter as Shift Value $R[n,m,t]=s \times N_{DRU}+P_{(s+t)}[n]$ where $s=(f_2 \times m+f_2 \times n+t) \bmod N_{pair,PRU}$ [Equation 5]

Intra-Row Permutation Using Time Parameter as Masking Value $R[n,m,t]=s \times N_{DRU}(P_s[n]+t) \bmod N_{DRU}$ where $s=(f_2 \times m+f_2 \times n+t) \bmod N_{pair,PRU}$ [Equation 6]

$P_s[•]$ results from cyclically shifting (rotating) the base permutation sequence P[•] to the left s times. Also, $P_{time}[t]$ may substitute for the time parameter t as a time shift value or a masking value in the above equations by use of a permutation sequence using the time parameter t as an input index, $P_{time}[\ ]$ B. Generation of permutation sequence using cell-specific, Time-Variant Intra-Row Permutation and Cell-Specific, Time-Variant Intra-Column Permutation A time-variant intra-row permutation may also be applied to the permutation pattern generated by [Equation 2]. In this case, the time parameter t may be used together with a cell-specific coefficient Coeff(Cell_ID), as a shift value or a masking value for the intra-row permutation. Coeff(•) is a function having a cell Identity (Cell_ID) as an element.

Intra-Row Permutation Using Time Parameter as Shift Value $$R[n,m,t,\text{Cell\_ID}]=s \times N_{DRU}+P_{(s+\text{Coeff}(\text{Cell\_ID}) \times t)}[n]$$

where $s=(f_2 \times m + f_2 \times n + \text{Coeff}(\text{Cell\_ID}) \times t) \mod N_{pair,PRU}$ [Equation 7]

Intra-Row Permutation Using Time Parameter as Masking Value $$R[n,m,t,\text{Cell\_ID}]=s \times N_{DRU}+P_s[n]+\text{Coeff}(\text{Cell\_ID}) \times t) \mod N_{DRU}$$

where $s=(f_1 \times m + f_2 \times n + \text{Coeff}(\text{Cell\_ID}) \times t) \mod N_{pair,PRU}$ [Equation 8]

C. Generation of Permutation Sequence Using Time-Variant Intra-Row Permutation and Time-Invariant Intra-Column Permutation In case of time-invariant intra-column permutation, the time parameter t is not used for calculation of the s value. Rather, the time parameter t is used only for intra-row permutation.

Intra-Row Permutation Using Time Parameter as Shift Value $$R[n,m,t]=s \times N_{DRU}+P_{(s+t)}[n]$$

where $s=(f_1 \mu m + f_2 \times n) \mod N_{pair,PRU}$ [Equation 9]

Intra-Row Permutation Using Time Parameter as Masking Value $$R[n,m,t]=s \times N_{DRU}+(P_s[n]+t) \mod N_{DRU}$$

where $s=(f_1 \mu m + f_2 \times n) \mod N_{pair,PRU}$ [Equation 10]

D. Generation of Permutation Sequence Using Cell-Specific, Time-Variant Intra-Row Permutation and Time-Invariant Intra-Column Permutation In case of time-invariant intra-column permutation, the time parameter t is not used for calculation of the s value. Rather, the time parameter t is used together with a cell-specific coefficient Coeff(Cell_ID), only for intra-row permutation.

Intra-Row Permutation Using Time Parameter as Shift Value $$R[n,m,t,\text{Cell\_ID}]=s \times N_{DRU}+P_{(s+\text{Coeff}(\text{Cell\_ID}) \times t)}[n]$$

where $s=(f_1 \times m + f_2 \times n) \mod N_{pair,DRU}$ [Equation 11]

Intra-Row Permutation Using Time Parameter as Masking Value $$R[n,m,t,\text{Cell\_ID}]=s \times N_{DRU}+(P_s[n]+\text{Coeff}(\text{Cell\_ID}) \times t) \mod N_{DRU}$$

where $s=(f_1 \times m + f_2 \times n) \mod N_{pair,PRU}$ [Equation 12]

E. Generation of Permutation Sequence Using Cell-Specific Shift/Masking, Time-Variant Intra-Row Permutation, and Time-Invariant Intra-Column Permutation If the base permutation sequence P[•] for intra-row permutation is cell-common, it may be contemplated that one or more shift or masking values based on a cell ID are applied to the intra-row permutation.

Intra-Row Permutation Using Time and Cell-Specific Parameter as Shift Value $$R[n,m,t,\text{Cell\_ID}]=s \times N_{DRU}+P_{(s+t+SM(\text{Cell\_ID}))}[n]$$

where $s=(f_1 \times m + f_2 \times n) \mod N_{pair,PRU}$ [Equation 13]

Intra-Row Permutation Using Time and Cell-Specific Parameter as Masking Value $$R[n,m,t,\text{Cell\_ID}]=s \times N_{DRU}+(P_s[n]+t+SM(\text{Cell\_ID})) \mod N_{DRU}$$

where $s=(f_1 \times m + f_2 \times n) \mod N_{pair,PRU}$ [Equation 14]

In [Equation 13] and [Equation 14], SM(Cell_ID) denotes a cell-specific shift or masking value.

F. Generation of Permutation Sequence Using Cell-Specific Shift/Masking, Cell-Specific Time-Variant Intra-Row Permutation, and Time-Invariant Intra-Column Permutation If the base permutation sequence P[•] for intra-row permutation is a cell-common permutation pattern, it may be contemplated that one or more shift or masking values based on a cell ID are applied to the intra-row permutation. In this case, a cell-specific shift/masking value and a cell-specific time parameter may be used together.

Intra-Row Permutation Using Time and Cell-Specific Parameter as Shift Value $$R[n,m,t,\text{Cell\_ID}]=s \times N_{DRU}+P_{(s+\text{Coeff}(\text{Cell\_ID}) \times t+SM(\text{Cell\_ID}))}[n]$$

where $s=(f_1 \times m + f_2 \times n) \mod N_{pair,PRU}$ [Equation 15]

Intra-Row Permutation Using Time and Cell-Specific Parameter as Masking Value $$R[n,m,t,\text{Cell\_ID}]=s \times N_{DRU}+(P_s[n]+\text{Coeff}(\text{Cell\_ID}) \times t+SM(\text{Cell\_ID})) \mod N_{DRU}$$

where $s=(f_1 m + f_2 \times n) \mod N_{pair,PRU}$ [Equation 16]

FIGS. 16A to 18B illustrate results of performing time-variant permutation for distributed resources according to an embodiment of the present invention. FIGS. 16A, 16B and 16C illustrate a case of performing time-invariant intra-row permutation and time-variant intra-column permutation, FIGS. 17A and 17B illustrate a case of performing time-variant intra-row permutation and time-variant intra-column permutation, and FIGS. 18A and 18B illustrate a case of performing time-variant intra-row permutation and time-invariant intra-column permutation. The embodiment of the present invention is implemented by [Equation 2] and [Equation 4] under the following conditions.

For the case of FIGS. 16A, 16B an 16C: D=3, L=5, O=0, $N_{pair,PRU}$=8, $N_{DRU}$=5, s=(5×m+7×n+t)mod 8, and t=0~5.

for the case of FIGS. 17A and 17B: D=3, L=5, O=0, $N_{pair,PRU}$=8, $N_{DRU}$=5, s=(5×m+7×n+t)mod 8, and t=0~5; and for the case of FIGS. 18A and 18B: D=3, L=5, O=0, $N_{pair,PRU}$=8, $N_{DRU}$=5, s=(5×m+7×n)mod 8, and t=0~5.

FIGS. 16A, 17A and 18A illustrate the original sequence and results of applying time-variable permutation sequences based on the OFDMA symbol indexes t. In FIGS. 16A, 17A and 18A, each numeral denotes the index of a data subcarrier pair included in an OFDMA symbol. Data subcarrier pair indexes are assigned, considering total data subcarrier pairs included in a plurality of DRUs. PRU grouping is to group a plurality of logically contigous data subcarrier pairs into groups each having as many data subcarrier pairs as the number of DRUs. Meanwhile, in FIGS. 16B, 17B and 18B, each numeral denotes a group number or an element index in each group. It is noted from FIGS. 16A to 18B that distributed resources are distributed in a different pattern over time.

Example 2-2

Permutation of Distributed Resources Using Sequence

Unless otherwise specified, like reference characters denote the same, while some reference characters are defined in different meanings. These reference characters are defined as follows.

Psc: the number of subcarriers of an $l^{th}$ OFDMA symbol in a PRU $n_l$: the number of pilot subcarriers of the $l^{th}$ OFDMA symbol in the PRU $L_{SC,l}$: the number of data subcarriers of the $l^{th}$ OFDMA symbol in the PRU ($P_{SC}-n_l$)

$L_{SP,l}$: the number of data subcarrier pairs of the $l^{th}$ OFDMA symbol in the PRU ($L_{SC,l}/2$)

PermSeq( ): A permutation sequence for subcarriers (e.g., AEPS)

Distributed resources may be permuted using a sequence as follows.

Step 1: Allocate $n_l$ pilots to an $l^{th}$ OFDMA symbol in each DRU. $DRU_{FPi}[j]$ data subcarriers in the $l^{th}$ OFDMA symbol are denoted by $SC_{DRUj,l,FPi}$ ($0<=j<L_{DRU,FPi}$). Herein, $SC_{DRUj,l,FPi}$ ranges from 0 to $L_{SC,l}-1$.

Step 2: Renumber $L_{DRU,FPi} \times L_{SC,l}$ data subcarriers included in DRUs in order, from 0 to $L_{DRU,FPi} \times_{SC,l}-1$. The logically contiguous renumbered subcarriers are grouped into $L_{DRU,FPi} \times_{SP,l}$ pairs and renumbered 0 to $L_{DRU,FPi} \times_{SP,l}-1$. The renumbered subcarrier pairs in the $l^{th}$ OFDMA symbol are denoted by $RSP_{l,FPi}$. $RSP_{l,FPi}$ may be defined as $$RSP_{l,FPi}[u]=(SC_{DRUj,l,FPi}[2v], SC_{DRUj,l,FPi}[2v+1]),$$
$$0 \leq u < L_{DRU,FPi}L_{SP,l}$$

where $j=\lfloor u/L_{SP,l} \rfloor$ and $v=\{u\} \mod(L_{SP,l})$. [Equation 17]

In [Equation 17], $\lfloor \rfloor$ denotes a floor function that returns the value of the expression contained in the brackets rounded down to its nearest integer.

Step 3: Apply a subcarrier permutation equation to $RSP_{l,FPi}$ to form Permuted Subcarrier Pairs (PSPs) 0 to $L_{DRU,FPi} \times L_{SP,l}-1$. Map PSPs $[s \times L_{SP,l},(s+1) \times L_{SP,l}-1]$ to an $s^{th}$ DLRU ($s=0, 1, \ldots, L_{DRU,FPi}-1$). The subcarrier permutation equation may be given as $$SP_{LRUs,l,FPi}[m]=RSP_{l,FPi}[k], 0 \leq m < L_{SP,l} \quad \text{[Equation 18]}$$

where $SP_{LRUs,l,FPi}[m]$ denotes an $m^{th}$ subcarrier pair ($0 \leq m < L_{SP,l}$) within the $l^{th}$ OFDMA symbol ($0 \leq l < N_{sym,l}$) in an $s^{th}$ DRU of a $t^{th}$ subframe, t denotes a subframe index defined with respect to a frame, and s denotes a DLRU index ($0 \leq s < L_{DRU,FPi}$).

In [Equation 18], k may be defined as the following equation.

$$k=L_{DRU,FPi} \times f(m,s)+g(\text{PermSeq}(\ ),s,m,l,t),$$

$$k=\{L_{DRU,FPi} \times f(m,s)+g(\text{PermSeq}(\ ),s,m,l,t)+l \times L_{SP,l}\}$$
$$\mod \{L_{SP,l} \times L_{DRU,FPi}\},$$

or $$k=L_{DRU,FPi} \times f(m,s)+\{g(\text{PermSeq})(\ ),s,m,l,t)+l \times L_{SP,l}+$$
$$DL\_PermBase\} \mod \{L_{DRU,FPi}\} \quad \text{[Equation 19]}$$

where $f(m,s)$ is a function having values $[0, L_{SP,l}-1]$, $g(\text{PermSeq}(\ ),s,n,t)$ denotes a permutation sequence of length $L_{DRU,FPi}$. For example, $g(\text{PermSeq}(\ ),s,n,t)$ may be a permutation sequence having values $[0, L_{DRU,FPi}-1]$. That is, each element of $g(\text{PermSeq}(\ ),s,n,t)$ may have one of the values $[0, L_{DRU,FPi}-1]$. $g(\text{PermSeq}(\ ),s,n,t)$ may be obtained by modifying a base sequence PermSeq( ) with the at least one of parameters s, n and t. PermSeq( ) denotes a base permutation sequence of length $L_{DRU,FPi}$. For example, PermSeq( ) may be a permutation sequence having values $[0, L_{DRU,FPi}-1]$. That is, each element of PermSeq( ) may have one of the values $[0, L_{DRU,FPi}-1]$. PermSeq( ) may be acquired by a known random sequence generation method. For instance, PermSeq( ) may be computed by an AEPS generation method. DL_PermBase denotes an integer equal to or greater than 0, which may be replaced with Cell_ID or a value related to Cell_ID.

f (ms) may be defined as $$f(m,s)=(f_1 \times m+f_2 \times s) \mod L_{SP,l},$$

$$f(m,s)=(5m+7s) \mod L_{SP,l},$$

$$f(m,s)=(m+13s) \mod L_{SP,l}, \text{ or}$$

$$f(m,s)=(m+17s) \mod L_{SP,l} \quad \text{[Equation 20]}$$

where $f_1$ is a positive integer that is prime for $L_{SP,l}$, $f_2$ is 0 or a positive integer that is prime for $L_{SP,l}$, and m, s and mod have been defined before.

$g(\text{PermSeq}(\ ),s,m,l,t)$ may be defined as $$g(\text{PermSeq}(\ ),s,m,l,t)=\text{PermSeq}(\{f(m,s)+s+l\} \mod \{L_{DRU,FPi}\}),$$

$$g(\text{PermSeq}(\ ),s,m,l,t)=\text{PermSeq}(\{f(m,s)+s+h(\text{cell\_ID}, L_{DRU,FPi}) \times l\} \mod \{L_{DRU,FPi}\}),$$

$$g(\text{PermSeq}(\ ),s,m,l,t)=\{\text{PermSeq}(\{f(m,s)+s+\} \mod \{L_{DRU,FPi}\})+DL\_PermBase\} \mod \{L_{DRU,FPi}\},$$

$$g(\text{PermSeq}(\ ),s,m,l,t)=\{\text{PermSeq}(\{f(m,s)+s+h(\text{cell\_ID}, L_{DRU,FPi}) \times 1\} \mod \{L_{DRU,FPi}\})+DL\_PermBase\} \mod \{L_{DRU,FPi}\},$$

$$g(\text{PermSeq}(\ ),s,m,l,t)=\text{PermSeq}(\{f(m,s)+s+l+q(N\_sym,\text{cell\_ID},L_{DRU,FPi}) \times t\} \mod \{L_{DRU,FPi}\}),$$

$$g(\text{PermSeq}(\ ),s,m,l,t)=\text{PermSeq}(\{f(m,s)+s+h(\text{cell\_ID}, L_{DRU,FPi}) \times l+q(N\_sym,\text{cell\_ID},L_{DRU,FPi}) \times t\} \mod \{L_{DRU,FPi}\}),$$

$$g(\text{PermSeq}(\ ),s,m,l,t)=\{\text{PermSeq}(\{f(m,s)+s+l+q(N\_sym,\text{cell\_ID},L_{DRU,FPi}) \times t\} \mod \{L_{DRU,FPi}\})+DL\_PermBase\} \mod \{L_{DRU,FPi}\}, \text{ or}$$

$$g(\text{PermSeq}(\ ),s,m,l,t)=\{\text{PermSeq}(\{f(m,s)+s+h(\text{cell\_ID}, L_{DRU,FPi}) \times l+q(N\_sym,\text{cell\_ID},L_{DRU,FPi}) \times t\} \mod \{L_{DRU,FPi}\})+DL\_PermBase\} \mod \{L_{DRU,FPi}\} \quad \text{[Equation 21]}$$

where $h(\text{cell\_ID},L_{DRU,FPi})$ denotes a function of a cell ID and $L_{DRU,FPi}$. For example, $h(\text{cell\_ID},L_{DRU,FPi})$ may be a prime number (e.g., 107), $D_{SP}$, $O_{SP}$ or DL_PermBase. $D_{SP}$ and $O_{SP}$ will be described later.

$q(N\_sym, \text{cell\_ID},L_{DRU,Fpi})$ represents a function of the number of OFDMA symbols in a PRU (N_sym), a cell ID, and $L_{DRU,FPi}$. For example, $q(N\_sym, \text{cell\_ID},L_{DRU,FPi})$ may be N_sym, a prime number, $D_{SP}$, $O_{SP}$, or DL_PermBase.

PermSeq( ) may be defined as follows.

$$PermSeq(i) = \left\{ D_{SP} \times i + O_{SP} + \left\lfloor i \cdot \frac{GCD(L_{DRU,FPi}, D_{SP})}{L_{DRU,FPi}} \right\rfloor \right\} \mod L_{DRU,FPi}$$

$$(i = 0 \sim L_{DRU,FPi} - 1)$$

[Equation 22]

where $D_{SP}$ determines the spacing between subcarrier pairs with logically contiguous indexes in a sequence and $O_{SP}$ determines the start position of a subcarrier pair (i.e. offset) in the sequence. $D_{SP}$ and $O_{SP}$ each may be defined as a function of Cell_ID and $L_{DRU,FPi}$. For example, $D_{SP}$ and $O_{SP}$ may be defined as $$D_{SP} = \{Cell\_ID\} \mod \{L_{DRU,FPi} - 1\} + 1 \quad \text{[Equation 23]}$$

and $$O_{SP} = \left\lfloor \frac{Cell\_ID}{(L_{DRU,FPi} - 1)} \right\rfloor + 1,$$

$$D_{SP} = \{SEED\} \mod \{L_{DRU,FPi} - 1\} + 1$$

and $$O_{SP} = \left\lfloor \frac{SEED}{(L_{DRU,FPi} - 1)} \right\rfloor + 1,$$

or $$D_{SP} = f(SEED)$$

and $$O_{SP} = g(SEED)$$

where SEED may be computed by a function having Cell_ID as an element (SEED=p(Cell_ID)). For example, SEED={Cell_ID×prime number} mod {$2^{number\ of\ SEED\ bits}$}. f(SEED) and g(SEED) each represent a function having SEED as an element. For example, f(SEED)=floor(SEED/$2^5$)+1 and g(SEED)={SEED} mod {$2^5$}. floor( ) represents a floor function that returns the value of the expression between the brackets rounded down to the nearest integer. $D_{SP}$ may be exchanged with $O_{SP}$, $L_{DRU,FPi}-1$ may be replaced with $L_{DRU,FPi}+1$ may be omitted from the ends of the equations of $D_{SP}$ and $O_{SP}$.

Figure 19:
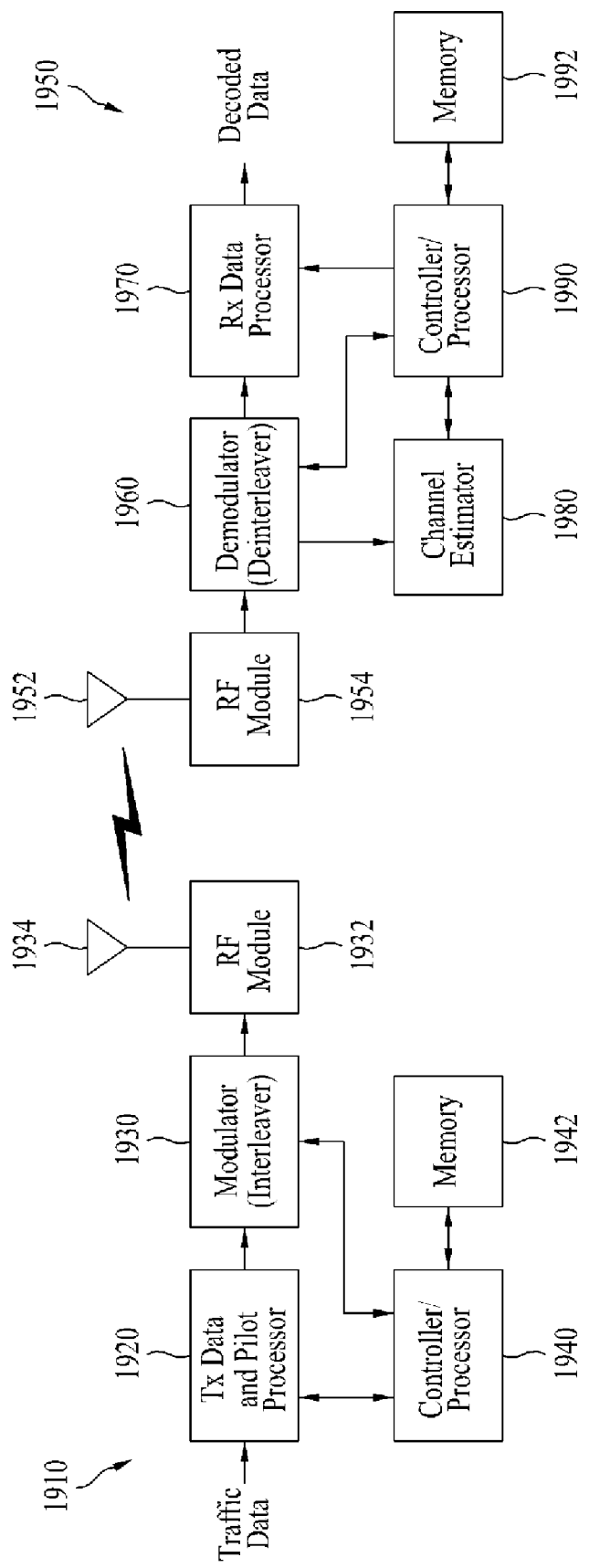
FIG. 19 is a block diagram of a transmitter and a receiver according to an embodiment of the present invention.

FIG. 19 is a block diagram of a transmitter and a receiver according to an embodiment of the present invention. A transmitter 1910 is part of a BS and a receiver 1950 is part of a UE in a downlink, whereas the transmitter 1910 is part of the UE and the receiver 1950 is part of the BS in an uplink.

Referring to FIG. 19, in the transmitter 1910, a Transmission (Tx) data and pilot processor 1920 generates data symbols by subjecting data (e.g. traffic data and signaling information) to encoding, interleaving, and symbol mapping. The Tx data and pilot processor 1920 also generates pilot symbols and multiplexes the data symbols with the pilot symbols. A modulator 1930 generates transmission symbols according to a radio access scheme. The radio access scheme may be FDMA, TDMA, CDMA, SC-FDMA, MC-FDMA, OFDMA, or a combination of them. Also, the modulator 1930 distributes the data over time and frequency areas, for transmission, by various permutation schemes according to embodiments of the present invention. An RF module 1932 generates an RF signal by processing the transmission symbols (e.g. digital-to-analog conversion, amplification, filtering, and frequency upconversion) and transmits the RF signal through an antenna 1934.

In the receiver 1950, an antenna 1952 receives a signal from the transmitter 1910 and provides the received signal to an RF module 1954. The RF module 1954 provides input samples to a demodulator 1960 by processing the received signal (e.g., filtering, amplification, frequency downconversion, and analog-to-digital conversion). The demodulator 1960 acquires data values and pilot values by demodulating the input samples. A channel estimator 1980 performs channel estimation using the pilot values received from the demodulator 1960. Also, the demodulator 1960 detects (or equalizes) data from the data values using the channel estimate and outputs data symbol estimates. The demodulator 1960 may also reorder data distributed across time and frequency areas in their original order by de-permutation corresponding to the various permutation schemes according to the embodiments of the present invention. A Reception (Rx) data processor 1970 symbol-demaps, deinterleaves, and decodes the data symbol estimates. In general, the demodulator 1960 and the Rx data processor 1970 of the receiver 1950 operate complimentarily with the modulator 1930 and the Tx data and pilot processor 1920 of the transmitter 1910, respectively.

Controllers/processors 1940 and 1990 manage and control the operations of various processing modules in the transmitter 1910 and the receiver 1950, respectively.

Memories 1942 and 1992 store program codes and data used for the transmitter 1910 and the receiver 1950, respectively.

The modules illustrated in FIG. 19 are meant for illustrative purposes. The transmitter and/or the receiver may further include a necessary module, some of the modules/functions of the transmitter and/or the receiver may be omitted, a single module may be separated into different modules, and two or more modules may be incorporated into a single module.

As is apparent from the above description, embodiments of the present invention have the following effects.

First of all, a method and apparatus for transmitting a signal in a wireless communication system are provided.

Secondly, a method and apparatus for performing permutation to increase a diversity gain during signal transmission are provided.

The present invention is applicable to a wireless communication system. Particularly, the present invention is applicable to a method and apparatus for transmitting a signal in a wireless communication system.

Exemplary embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an exemplary embodiment of the present invention or included as a new claim by a subsequent amendment after the application is filed.

In exemplary embodiments of the present invention, a description is made of a data transmission and reception relationship between a BS and a UE. In some cases, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'eNode B' (eNB), 'access point', etc. The term 'UE' may be replaced with the term 'Mobile Station (MS)', 'Mobile Subscriber Station' (MSS), 'mobile terminal', etc.

Exemplary embodiments of the present invention may be achieved by various means, for example, hardware, firmware, software, or a combination thereof. In a hardware configuration, embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, embodiments of the present invention may be implemented in the form of a module, a procedure, a function, etc. performing the above-described functions or operations. A software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for transmitting signals by a base station in a wireless communication system, the method comprising:
grouping data subcarriers of one or more Distributed Resource Units (DRUs) in an l-th Orthogonal Frequency Division Multiple Access (OFDMA) symbol into a plurality of subcarrier pairs;
permutating the plurality of subcarrier pairs of the l-th OFDMA symbol; and
transmitting signals through the plurality of permutated subcarrier pairs of the l-th OFDMA symbol,
wherein the permutating is performed by using the following equation, $q(\text{PermSeq}(\ ),s,m,l) = \{\text{PermSeq}(\{f(\ )+s+l\} \mod \{L_{DRU,FPi}\}) + \text{Downlink\_PermBase}\} \mod \{L_{DRU,FPi}\}$ where PermSeq( ) denotes a permutation sequence of length $L_{DRU,FPi}$, f( ) denotes a function having values [0, $L_{SP,l}-1$] in accordance with at least m and s, $L_{SP,l}$ denotes a number of subcarrier pairs in the l-th OFDMA symbol within a Physical Resource Unit (PRU), m denotes a subcarrier pair index, s denotes a Distributed Logical Resource Unit (DLRU) index, l denotes an OFDMA symbol index, $L_{DRU,FPi}$ denotes a number of DRUs in an $i^{th}$ frequency partition (FP$_i$), Downlink_PermBase denotes 0 or a positive integer, and mod represents a modulo operation.

2. The method of claim 1, wherein the Downlink_PermBase is set to a cell identifier or a value related to the cell identifier.

3. A method for processing signals by a mobile station in a wireless communication system, the method comprising:
receiving signals through data subcarriers of one or more Distributed Resource Units (DRUs) in an l-th Orthogonal Frequency Division Multiple Access (OFDMA) symbol;
grouping subcarriers of the l-th OFDMA symbol into a plurality of subcarrier pairs; and
de-permutating the plurality of subcarrier pairs of the l-th OFDMA symbol,
wherein the de-permutating is performed by using the following equation, $g(\text{PermSeq}(\ ),s,m,l) = \{\text{PermSeq}(\{f(\ )+s+l\} \mod \{L_{DRU,FPi}\}) + \text{Downlink\_PermBase}\} \mod \{L_{DRU,FPi}\}$ where PermSeq( ) denotes a permutation sequence of length $L_{DRU,FPi}$, f( ) denotes a function having values [0, $L_{SP,l}-1$] in accordance with at least m and s, $L_{SP,l}$ denotes a number of subcarrier pairs in the l-th OFDMA symbol within a Physical Resource Unit (PRU), m denotes a subcarrier pair index, s denotes a Distributed Logical Resource Unit (DLRU) index, l denotes an OFDMA symbol index, $L_{DRU,FPi}$ denotes a number of DRUs in an frequency partition (FP$_i$), Downlink_PermBase denotes 0 or a positive integer, and mod represents a modulo operation.

4. The method of claim 3, wherein the Downlink_PermBase is set to a cell identifier or a value related to the cell identifier.

5. A mobile station comprising:
a Radio Frequency (RF) module for receiving signals through data subcarriers of one or more Distributed Resource Units (DRUs) in an l-th Orthogonal Frequency Division Multiple Access (OFDMA) symbol; and
a processor for grouping the data subcarriers of the l-th OFDMA symbol into a plurality of subcarrier pairs and, for de-permutating the plurality of subcarrier pairs of the l-th OFDMA symbol,
wherein the de-permutating is performed by using the following equation, $g(\text{PermSeq}(\ ),s,m,l) = \{\text{PermSeq}(\{f(\ )+s+l\} \mod \{L_{DRU,FPi}\}) + \text{Downlink\_PermBase}\} \mod \{L_{DRU,FPi}\}$ where PermSeq( ) denotes a permutation sequence of length $L_{DRU,FPi}$, f( ) denotes a function having values [0, $L_{SP,l}-1$] in accordance with at least m and s, $L_{SP,l}$ denotes a number of subcarrier pairs in the l-th OFDMA symbol within a Physical Resource Unit (PRU), m denotes a subcarrier pair index, s denotes a Distributed Logical Resource Unit (DLRU) index, l denotes an OFDMA symbol index, $L_{DRU,FPi}$ denotes a number of DRUs in an $i^{th}$ frequency partition (FP$_i$), Downlink_PermBase denotes 0 or a positive integer, and mod represents a modulo operation.

6. The mobile station of claim 5, wherein the Downlink_PermBase is set to a cell identifier or a value related to the cell identifier.

7. A base station comprising:
a processor for grouping data subcarriers of one or more Distributed Resource Units (DRUs) in an l-th Orthogonal Frequency Division Multiple Access (OFDMA) symbol into a plurality of subcarrier pairs and, for permutating the plurality of subcarrier pairs of the l-th OFDMA symbol; and
a Radio Frequency (RF) module for transmitting signals through the plurality of permutated subcarrier pairs of the l-th OFDMA symbol,
wherein the permutating is performed by using the following equation, $g(\text{PermSeq}(\ ),s,m,l) = \{\text{PermSeq}(\{f(\ )+s+l\} \mod \{L_{DRU,FPi}\}) + \text{Downlink\_PermBase}\} \mod \{L_{DRU,FPi}\}$ where PermSeq( ) denotes a permutation sequence of length $L_{DRU,FPi}$, f( ) denotes a function having values [0, $L_{SP,l}-1$] in accordance with at least m and s, $L_{SP,l}$ denotes a number of subcarrier pairs in the l-th OFDMA symbol within a Physical Resource Unit (PRU), m denotes a subcarrier pair index, s denotes a Distributed Logical Resource Unit (DLRU) index, l denotes an OFDMA symbol index, $L_{DRU,FPi}$ denotes a number of DRUs in an $i^{th}$ frequency partition (FP$_i$), Downlink_PermBase denotes 0 or a positive integer, and mod represents a modulo operation.

8. The base station of claim 7, wherein the Downlink_PermBase is set to a cell identifier or a value related to the cell identifier.

* * * * *